(12) United States Patent
Lurie

(10) Patent No.: US 9,969,413 B2
(45) Date of Patent: May 15, 2018

(54) WHEELED CART FOR CARRYING AND SECURING SKI EQUIPMENT AND PERSONAL ITEMS

(71) Applicant: SKI CARRIERS, LLC, Englewood, CO (US)

(72) Inventor: Martin S Lurie, Englewood, CO (US)

(73) Assignee: SKI CARRIERS, LLC, Englewood, CO (US)

(*) Notice: Subject to any disclaimer, the term of this patent is extended or adjusted under 35 U.S.C. 154(b) by 153 days.

(21) Appl. No.: 13/752,390

(22) Filed: Jan. 29, 2013

(65) Prior Publication Data

US 2014/0210172 A1 Jul. 31, 2014

Related U.S. Application Data

(63) Continuation of application No. 10/854,410, filed on May 25, 2004, now Pat. No. 8,360,474.

(60) Provisional application No. 60/473,592, filed on May 25, 2003, provisional application No. 60/545,457, filed on Feb. 17, 2004.

(51) Int. Cl.
*B62B 1/26* (2006.01)
*A63C 11/02* (2006.01)
*B62B 1/14* (2006.01)
*B62B 1/00* (2006.01)

(52) U.S. Cl.
CPC .......... *B62B 1/262* (2013.01); *A63C 11/026* (2013.01); *B62B 1/14* (2013.01); *B62B 1/002* (2013.01); *B62B 1/008* (2013.01); *B62B 2202/401* (2013.01); *B62B 2501/02* (2013.01)

(58) Field of Classification Search
CPC .. B62B 1/008; B62B 1/04; B62B 1/06; B62B 1/20; B62B 1/22; B62B 1/262; B62B 2202/40; B62B 2202/401
USPC ..... 280/814, 815, 47.2, 47.24, 47.26, 47.33; 24/712.9, 130; 70/58, 449
See application file for complete search history.

(56) References Cited

U.S. PATENT DOCUMENTS

| | | | | |
|---|---|---|---|---|
| 3,210,787 A * | 10/1965 | Allsop | .......................... | 12/120.5 |
| 4,114,915 A * | 9/1978 | Lello et al. | ................ | 280/47.19 |
| 4,185,361 A * | 1/1980 | Stuart | ................................ | 70/58 |
| 4,268,050 A * | 5/1981 | Kennedy, Sr. | .................. | 280/38 |
| 4,792,073 A * | 12/1988 | Jacober | ......................... | 224/614 |
| 5,106,112 A * | 4/1992 | Sargent | .......................... | 280/40 |
| 5,340,153 A * | 8/1994 | Parker | ........................... | 280/814 |
| 6,158,762 A * | 12/2000 | Wong | ............................ | 280/652 |

(Continued)

*Primary Examiner* — Frank B Vanaman
(74) *Attorney, Agent, or Firm* — Vobach IP Law, LLC

(57) ABSTRACT

A wheeled hand-cart configured to carry and secure ski equipment and accessories is described. The hand-cart is of the type where a user adjusts an attitude of the hand-cart for rolling travel so as to balance the load about a wheel axis of the hand-cart. The hand-cart includes a load platform extensive enough to carry ski boots as well as a large securable container. Ski mounts joined to the hand-cart carry skis outboard of the load platform at an attitude that provides for ample clearance between the tips of the skis and the user's upper body. The ski-carrying cart may include a voluminous securable container to serve as a mobile ski locker, and locking devices may be provided to secure the skis and the cart. The hand-cart is further configured to partially collapse to a narrow-stance mode adapted for rolling travel in narrow spaces.

18 Claims, 21 Drawing Sheets

(56) References Cited

U.S. PATENT DOCUMENTS

Figure 1:
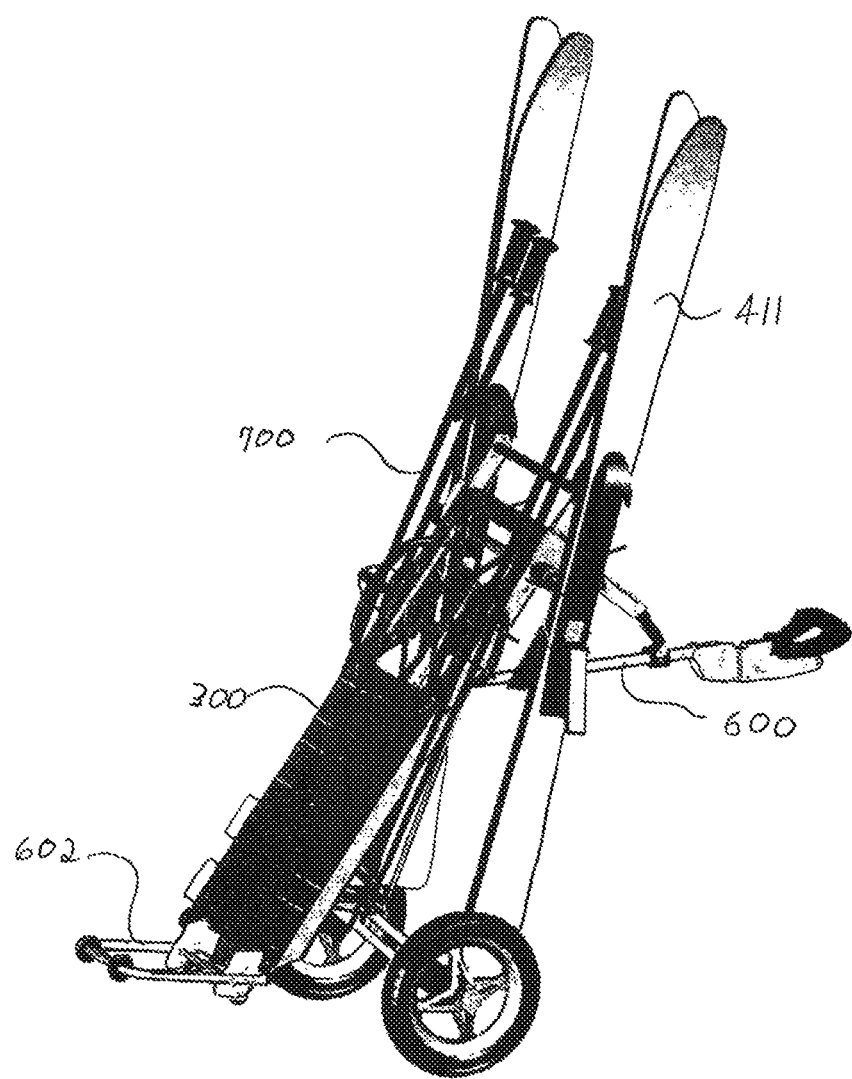

2007/0090616 A1* 4/2007 Tompkins .................. 280/47.28
2007/0222168 A1* 9/2007 Sellers et al. ................ 280/79.7

* cited by examiner

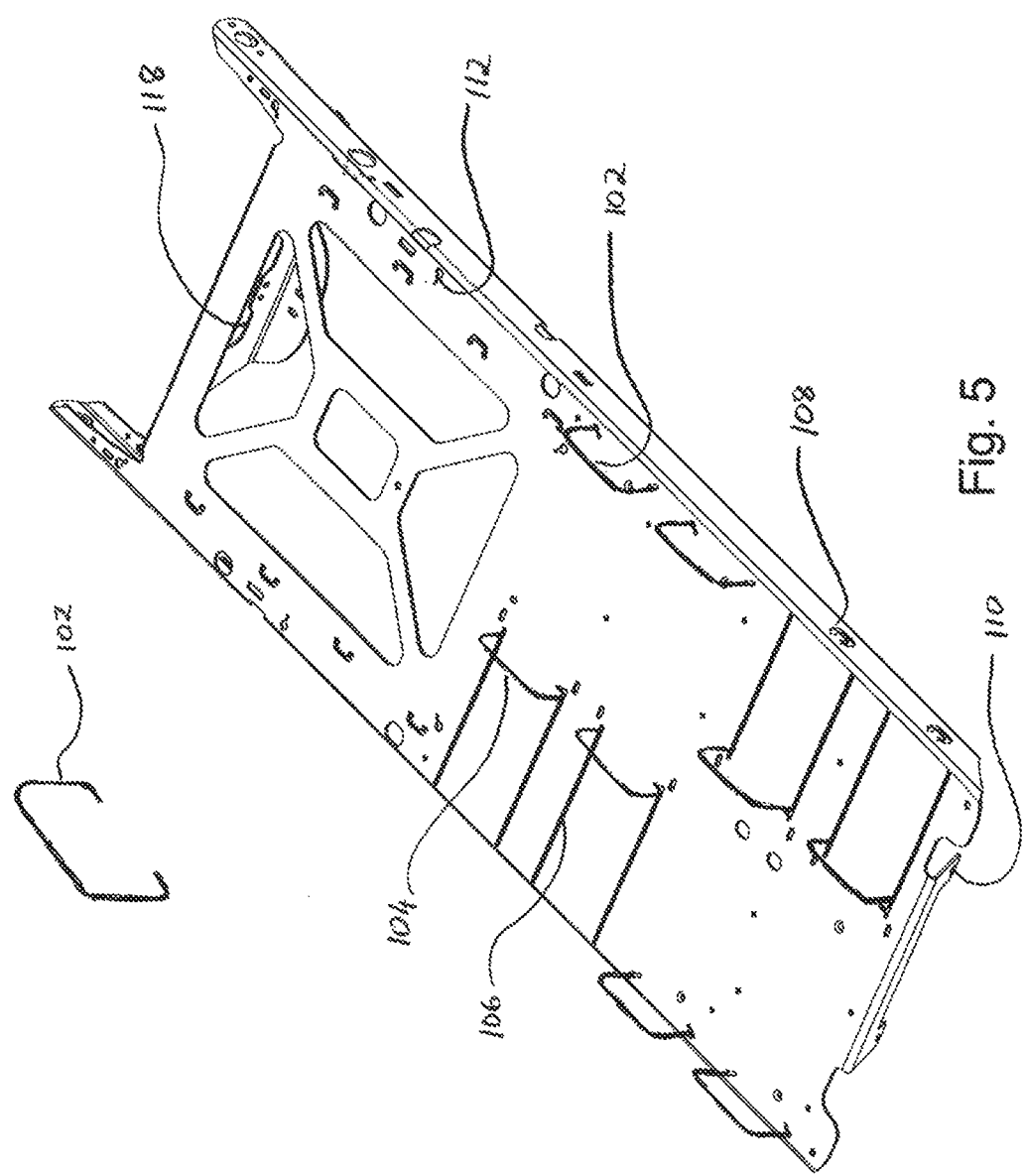

WHEELED CART FOR CARRYING AND SECURING SKI EQUIPMENT AND PERSONAL ITEMS

CROSS-REFERENCE TO RELATED APPLICATIONS

The present application is a continuation of U.S. patent application Ser. No. 10/854,410 entitled "Wheeled Cart for Carrying and Securing Snowsports Equipment and Personal Items, and Business Methods and Systems for Vending Same" filed on May 25, 2004, which is a non-provisional application claiming priority under 35 U.S.C. § 119(e) to U.S. Provisional Patent Application No. 60/473,592 entitled "Wheeled Cart for Carrying and Securing Snowsports Equipment and Personal Items, and Business Methods and Systems for Vending Same" filed on May 25, 2003, and to U.S. Provisional Application No. 60/545,457 filed on Feb. 17, 2004 and entitled "Further embodiments of a wheeled snowsports-equipment cart". Non-provisional U.S. patent application Ser. No. 10/854,410 cited above is hereby incorporated by reference in its entirety.

STATEMENT REGARDING FEDERALLY SPONSORED RESEARCH OR DEVELOPMENT

Not Applicable.

THE NAMES OF THE PARTIES TO A JOINT RESEARCH AGREEMENT

Not Applicable.

INCORPORATION-BY-REFERENCE OF MATERIAL SUBMITTED ON A COMPACT DISC

Not Applicable.

BACKGROUND OF THE INVENTION

Field of the Invention

The invention is part of the field relating to portable devices for carrying and storing ski equipment and accessories. More particularly, the invention relates to wheeled hand-carts used to assist in these and other functions.

Description of Related Art

Many skiers find that having to walk to a ski lift in ski boots while carrying their skis is uncomfortable at best, and painful and exhausting for many participants of the sport. Apparently as a consequence of this experience, many devices have been proposed to ease access to the slopes for many of those whose have to carry their equipment to the ski lift during any walk that takes longer than two or three minutes.

Prior-art devices incorporating wheels for carrying ski equipment may conveniently be classified into two kinds One kind would be those that use the carried ski equipment as a structural element, usually by attaching wheels and brackets or straps to the skis. Another kind would be the type where a structurally self-sufficient wheeled cart may be loaded with some or all of the equipment capable of being carried by the device, without the need for any of the carried equipment to serve as a structural element of the assemblage.

Yet another useful classification of the related art would be to divide devices for carrying ski equipment into one class in which the user must bear a substantial portion (perhaps half) of the weight of the carried equipment, and another class in which the intended mode of use is to pull the cart along with the weight of the loaded cart substantially balanced about the axis of its wheels, leaving very little vertical weight for the user to bear.

A further important class is those devices which do not carry ski boots, but instead require the user to either walk in the ski boots or else carry the boots independently of the device.

In all the classes above, devices have previously been proposed that would provide some means of securing at least some of the ski equipment and/or allow small personal items to be stored on the device.

However, it appears that none of the previous devices have succeeded in providing an elegant device that would allow a user to expend very little effort in pulling along a balanced load, carry all ski equipment and accessories, and serve as a secure and dry mobile locker that may be locked near the ski lift, in which skiers may leave their street shoes and other items that are not immediately needed.

BRIEF SUMMARY OF THE INVENTION

A two-wheeled cart for carrying snowsports equipment including skis, boots, poles, helmets and personal items is disclosed. The cart incorporates a weather-resistant security compartment to serve as a locker for storing street shoes and personal items. The cart has a collapsed mode for compact storage, a narrow-travel mode for use on shuttle buses, and a fully-deployed mode. The mass distribution on a loaded cart is such that the load is balanced, leaving very little vertical load on the user's pulling hand. To secure the cart while it is left unattended, users lock the cart to some structure close to the ski lift by means of an incorporated locking cable and locking mechanism. Additional locking cables provide security against theft of equipment left on the cart.

DESCRIPTION OF THE INVENTION

The subject invention is a two-wheeled pull cart for carrying snowsports equipment. The cart provides security for the equipment and incorporates a security compartment to store street shoes and personal items. The embodiments described here incorporate components of mass-produced golf carts available from third party distributors in order to make production of relatively small quantities of the product economically feasible.

Aspects and features of the invention—referred to here as a "cart"—are described under the headings below.

a. Equipment Carrying Features: The cart:
  i. Carries two sets of ski equipment (skis, poles, and boots) in the fully loaded configuration.
  ii. In a partially loaded configuration, can carry any subset of the load combinations described above without being out of balance or becoming unstable.
  iii. Carries clothing and accessories in a waterproof bag.
  iv. Requires no adjustment to accommodate skis up to about 200 cm in length. Can accommodate all sizes of ski boots.
  v. Requires no adjustment to fit with most types and sizes of ski bindings, or with different thicknesses of skis.
  vi. Will carry all widths of skis in the correct position without needing adjustment.

vii. Secures all pieces of equipment firmly so that items will not shake loose or fall off
b. Security Features: The present cart embodiment:
  i. Serves as a locker located at the slope-side ski racks.
  ii. Can store street shoes, clothing and other possessions in an integrated security compartment while the unit is left unattended.
  iii. Has locking cables to lock skis to the frame to help prevent theft of these items.
  iv. Incorporates a locking cable that secures the unit itself to a ski rack, pole or other suitable tethering point.
  v. Achieves all these securing functions using a single standard padlock.
  vi. Is configured so that the unit can easily be tethered where it is in full view of skiers 110 resting at slope-side facilities, serving as a deterrent to tampering.
c. Modes of Use: In this embodiment, the cart serves a range of purposes and functions effectively in a number of different conditions. The cart:
  i. Allows for much easier, faster and safer access to and from the slopes by carrying all the users' ski equipment and accessories while allowing users to walk in street shoes rather than ski boots.
  ii. Can easily be pulled and maneuvered in corridors, through standard doorways, on tarmac, over the uneven gravel of ski resort parking lots, on packed snow and through up to six inches of fresh snow.
  iii. Is configured so that two adults can carry a fully-loaded cart up or down stairs and around corners in stairwells.
  iv. Can be used on parking-lot shuttle buses: skis detach easily for stowing on the outside of the bus, and then a single movement folds the cart into the configuration of a dolly to wheel the rest of the load in the confined spaces of the bus aisle.
  v. Keeps boots dry and retains warmth by carrying them between a waterproof cover that stretches over all four boots and a vinyl sheet underneath.
  vi. Folds up flat for transport in the trunk of a sedan or for storage, facilitated by removable wheels and a collapsible mesh security bag constructed from flexible aircraft cable.
  vii. Can serve between ski trips as a compact organizer for storing boots, poles, helmets and accessories by transferring the folded and partially loaded cart directly from the car to hooks on a garage wall.
  viii. Is suitable for a range of compact storage configurations in vending situations.
  ix. Offers the possibility of advertising space on a banner mounted on the outside of the security bag.
  Ease of Use: The Cart:
  i. Exerts negligible vertical load on a user's pulling hand, because in the walking position the design puts the center of gravity directly over the wheel axles.
  ii. Does not require any special skill to pull, since the walking position keeps the tips of long skis well clear of the back of the puller's head and shoulders.
  iii. Allows for easy removal and reloading of any piece of ski equipment, since skis or poles do not form part of the cart's structure.
  iv. Secures boots firmly in individual mounts, so that heavy boots do not rattle about, and a separate boot bag is not needed.
  v. Has boot mounts that will accept boots slung in pairs from commonly-used carry-straps.
  vi. Places the boot deck at a convenient height and horizontal orientation for boot mounting and dismounting, when the unit is tipped forward to rest on its handle.
  vii. Is stable for traversing sloping ground, making toppling unlikely on any surface graded for access by people walking in ski boots.
  viii. Is stable for any order of loading, when loaded on level ground.
  ix. Eliminates the need for the wide clearance zone required for shoulder-carried skis, since the cart holds skis in a more or less vertical orientation when being pulled along and when at rest. This reduces the danger of injury from flailing skis and poles.
  x. Uses familiar means for holding skis and boots in place.
  xi. Folds down with the release of one clip, and each wheel can be detached or attached by flipping a lever.
  xii. Is constructed with materials for buckles, connectors and moving joints that repel water and are resistant to freezing together.
  xiii. Can have the cloths for the security bag liner and the outer banner selected from a range of colors, so that users are able to identify their unit among others on the ski racks by the particular color combination.
  xiv. Can be hosed down to wash away mud and slush.
b. Economy of Small-volume Manufacture: The current embodiments are designed to allow economical manufacture in smaller production runs than would typically be required for mass production of this type of product. These versions:
  i. Use the type of undercarriage and main tube commonly found on collapsible pull-carts sold for carrying golf bags. Any mass-produced golf pull-cart that has parallelogram-style undercarriage arms, removable wheels and is sufficiently robust can be adapted to the configuration described here.
  ii. Do not require any injection-molded or cast components for their manufacture.

Two constructions of the invention's main structure are described in this filing. Construction X ("Constr. X" in the text) is most suitable for small-scale production since the main structural components, and in particular the main platform, are fabricated from standard bar or sheet materials. Construction Y ("Constr. Y" in the text) is most suitable for larger-scale production 180 since the main structural components are fabricated from formed sheet materials. Note that common mechanical elements such as fasteners, pins and washers are usually not shown in the figures for Construction Y, but the holes through which they fit have been shown.

In cases where the text does not identify whether the figure relates to Construction X or 185 Construction Y, the classification may be found by inspection and comparison with other figures.

LIST OF FIGURES

FIG. 1 Partially Loaded, general view, Constr. Y
FIG. 2 Loaded, general view from rear.
FIG. 2*a* Folded for transport or storage, side view, Constr. Y
FIG. 2*b* Folded for transportation or storage, underside.
FIG. 3 Loaded, general view from front, Constr. X
FIG. 3*a* Ski pole upper mount, Constr. Y
FIG. 4 Positioned for boot mounting, Constr. Y FIG. 5 One-piece formed sheetmetal deck with boot-mounting clips, Constr. Y FIG. 5a Arrangement for tensioning the toe clips, Constr. Y FIG. 6 Partially loaded and folded for shuttle bus access.

Figure 6:
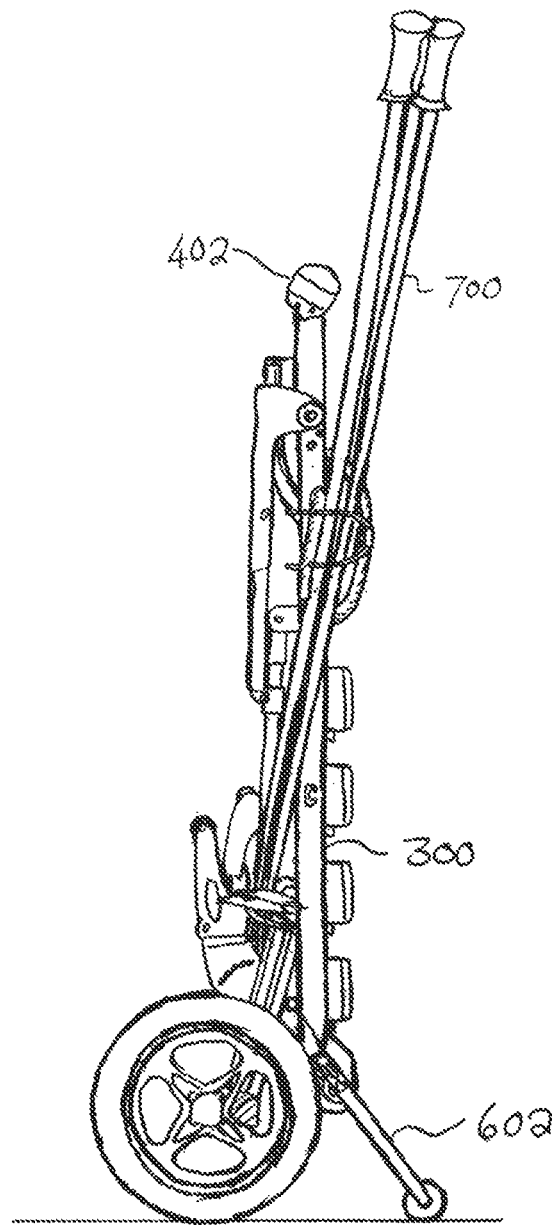
Figure 6A:
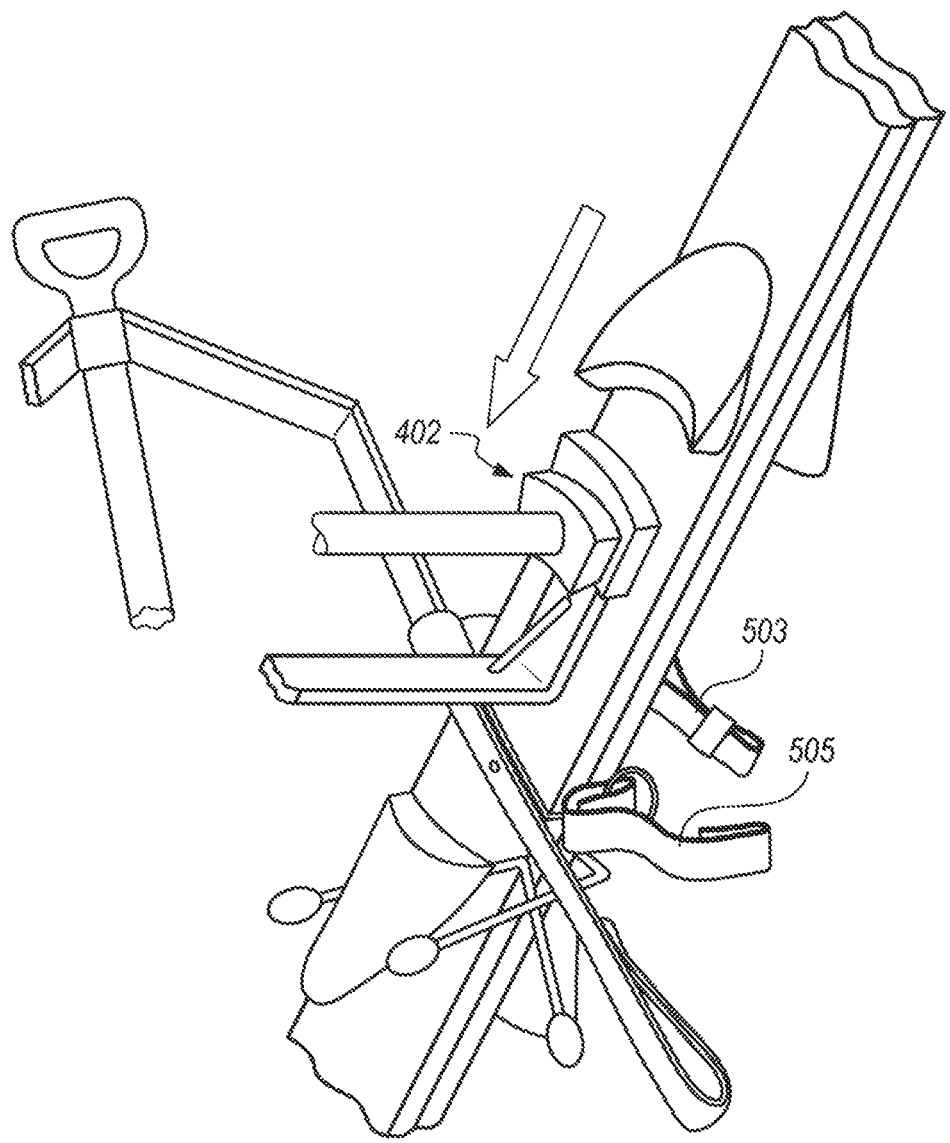

FIG. 6a Ski mounting.

Figure 7:
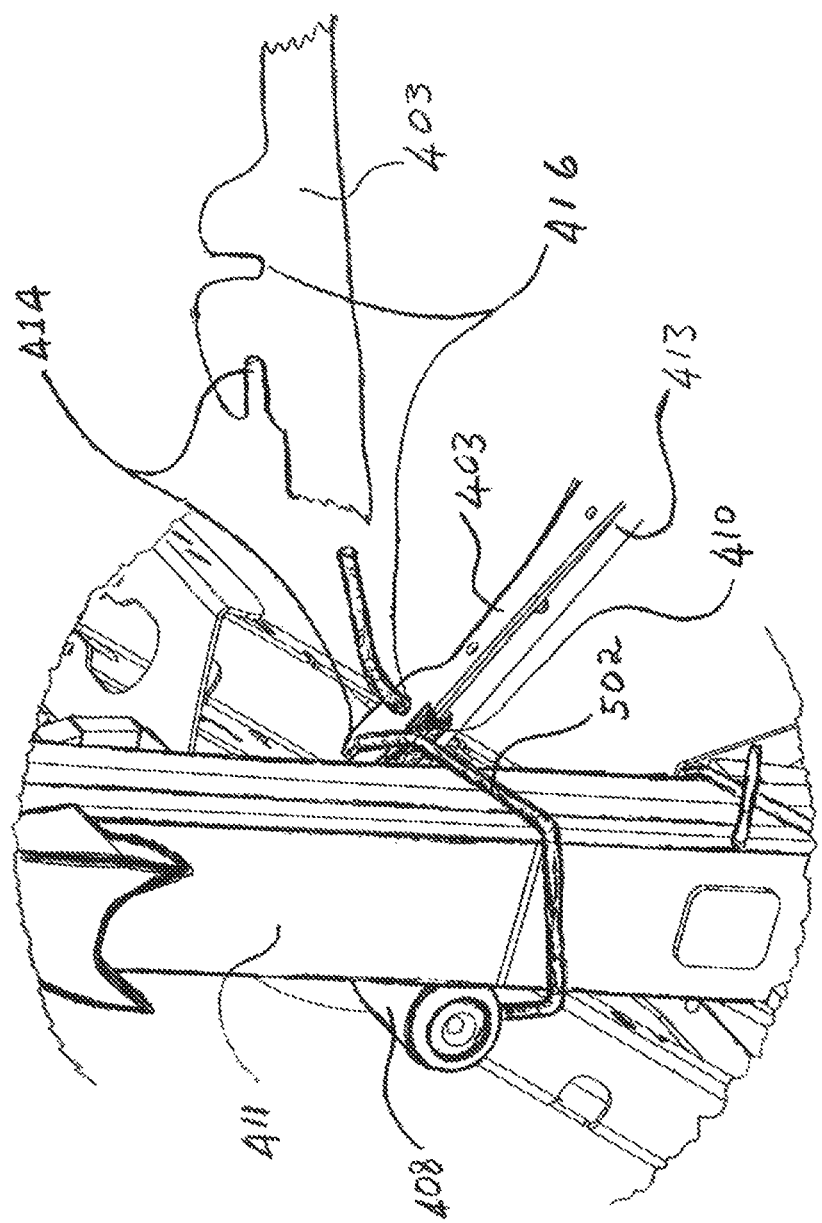

FIG. 7 Ski-mounting details, lower ski mounting bracket, Constr. Y

Figure 8:
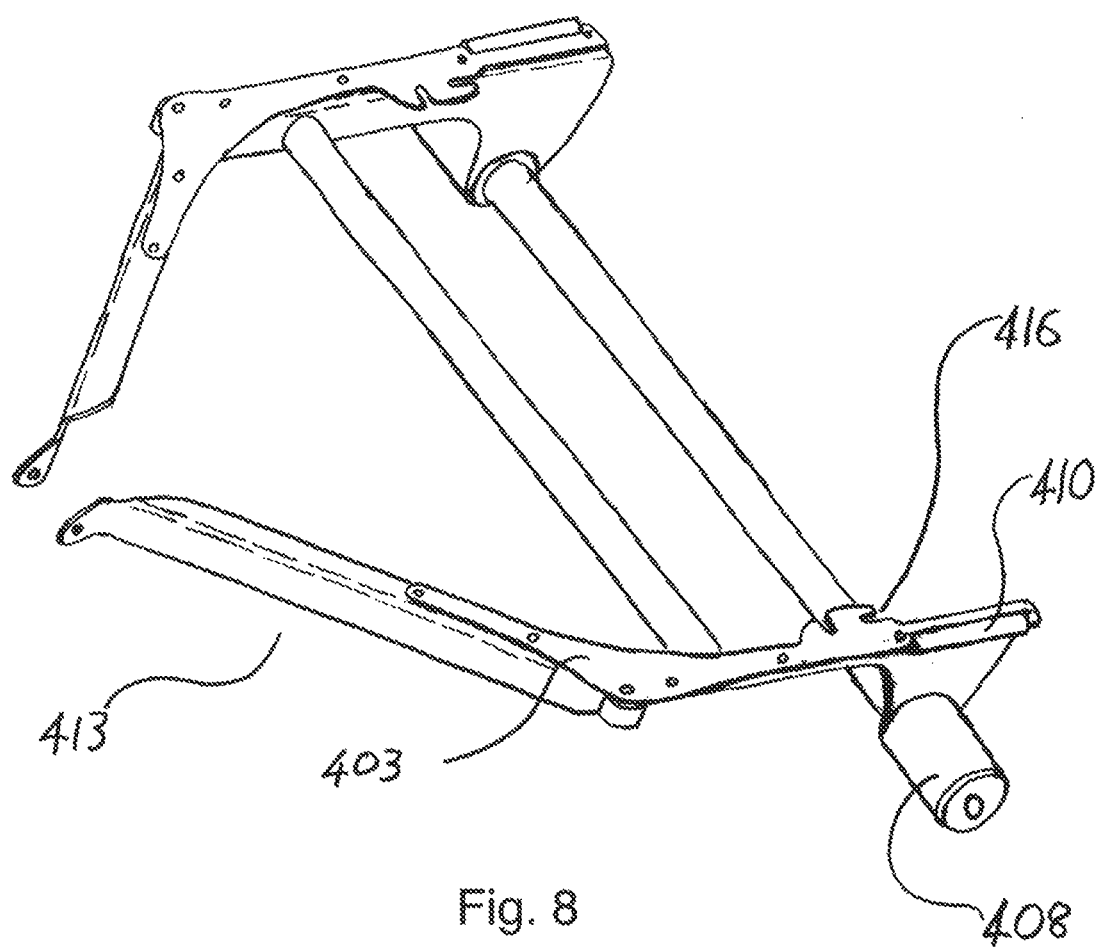

FIG. 8 Lower ski mounting bracket main arms, Constr. Y

Figure 9:
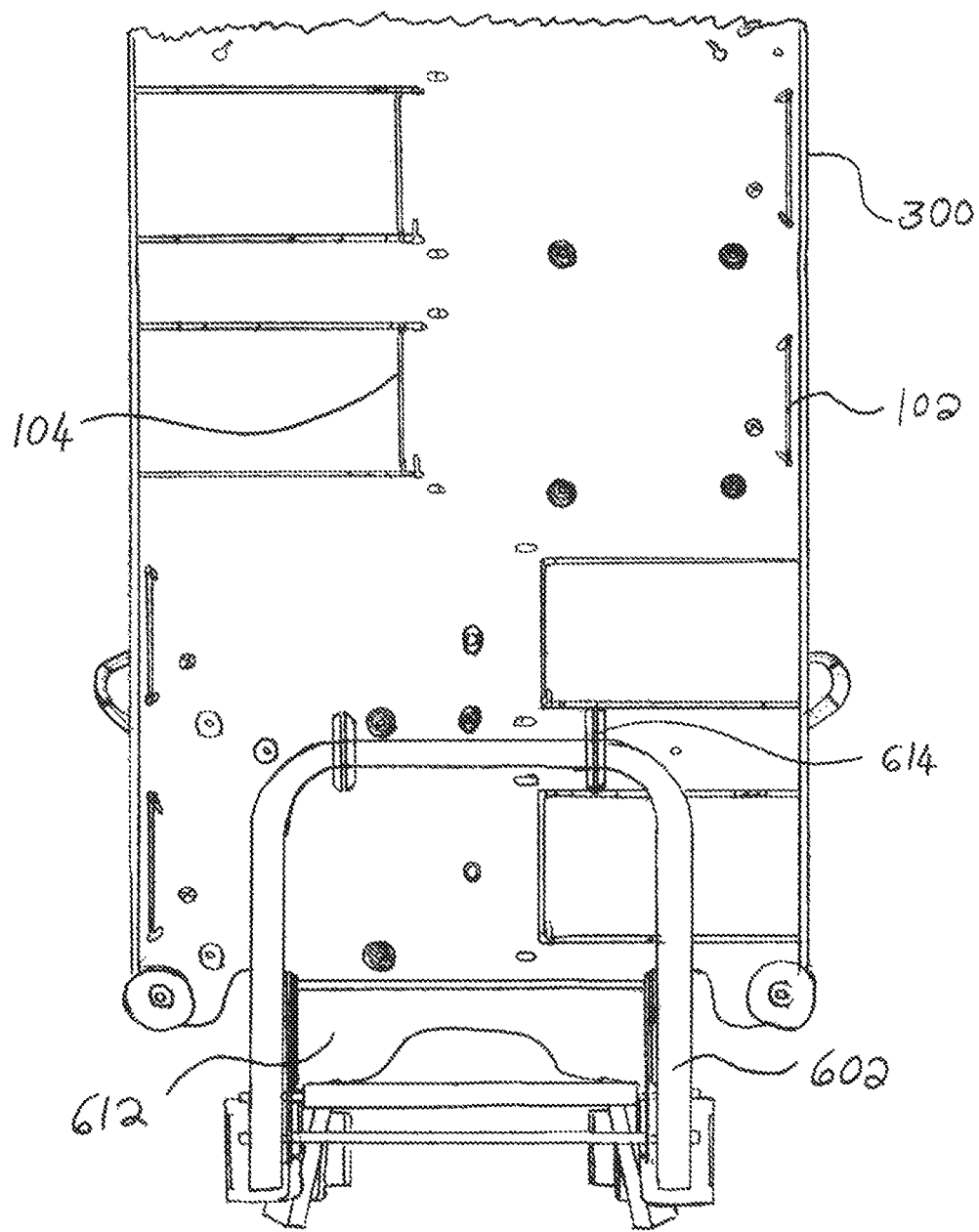

FIG. 9 Storage position for bottom handle, Constr. Y

Figure 10:
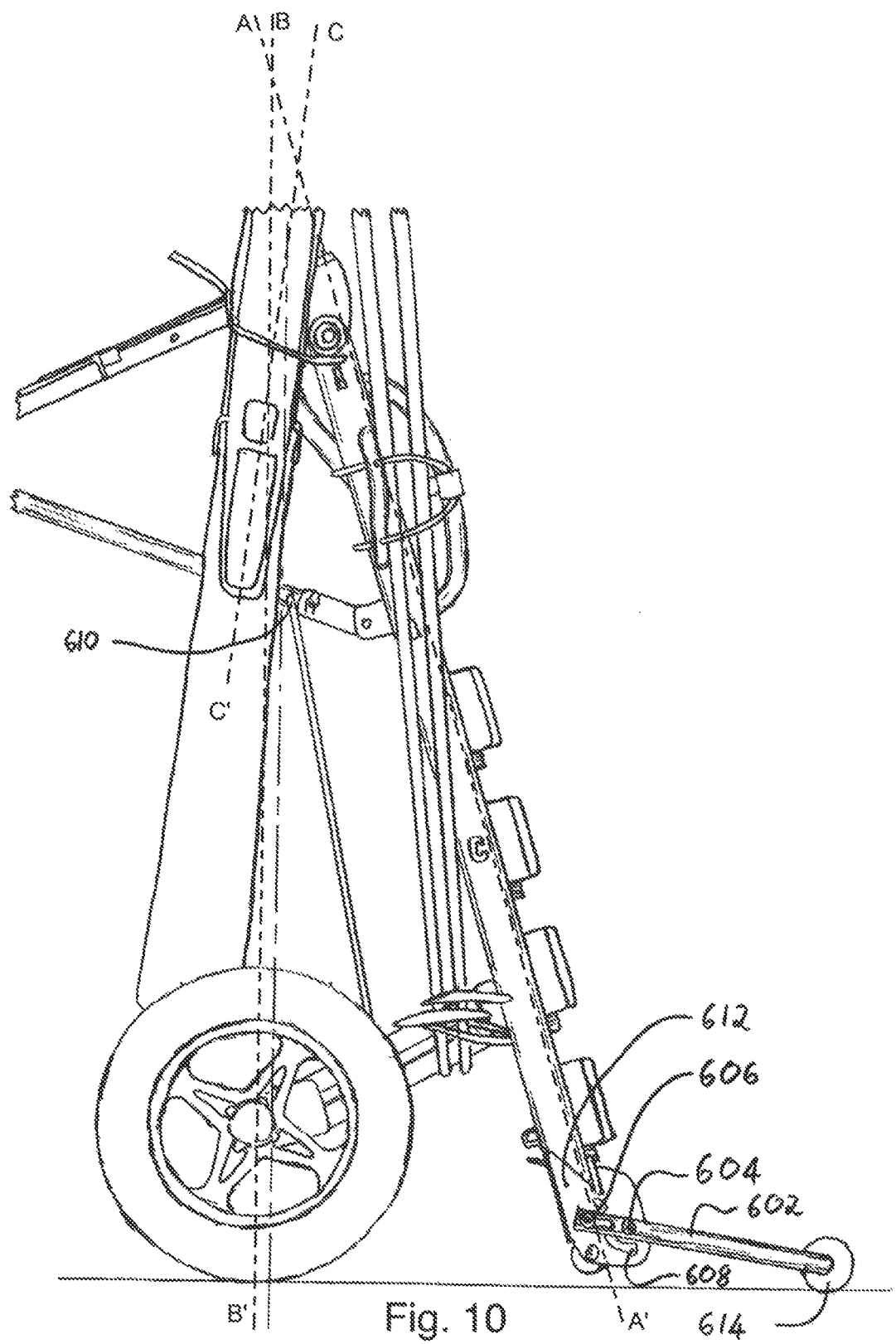

FIG. 10 Partially loaded, view from side, Constr. Y

Figure 11:
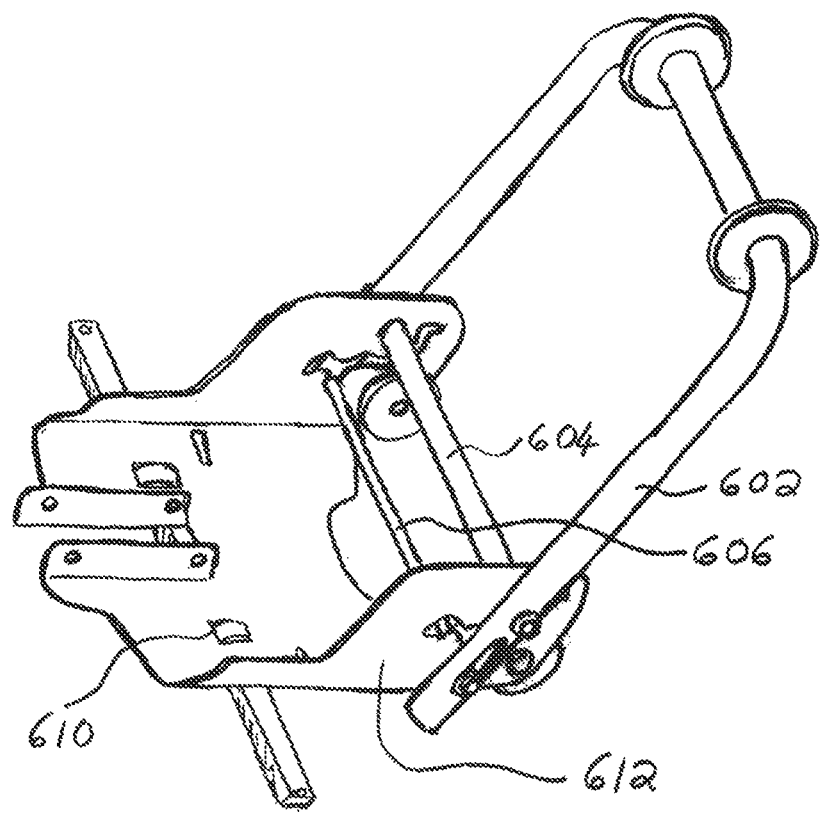

FIG. 11 Subframe and kickstand or bottom hoop assembly, Constr. Y

Figure 11A:
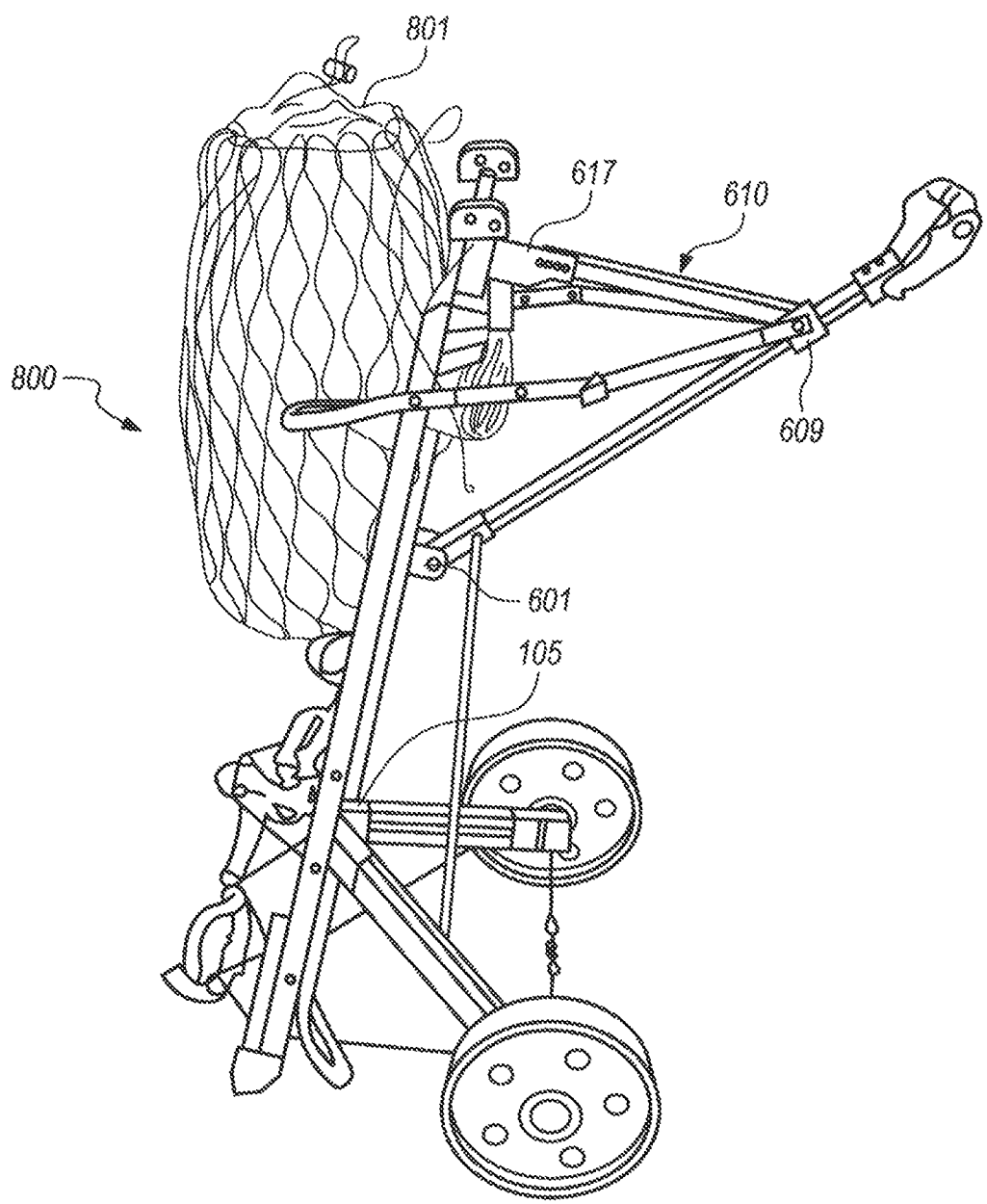

FIG. 11a Unloaded, view from side, Constr. X

Figure 12:
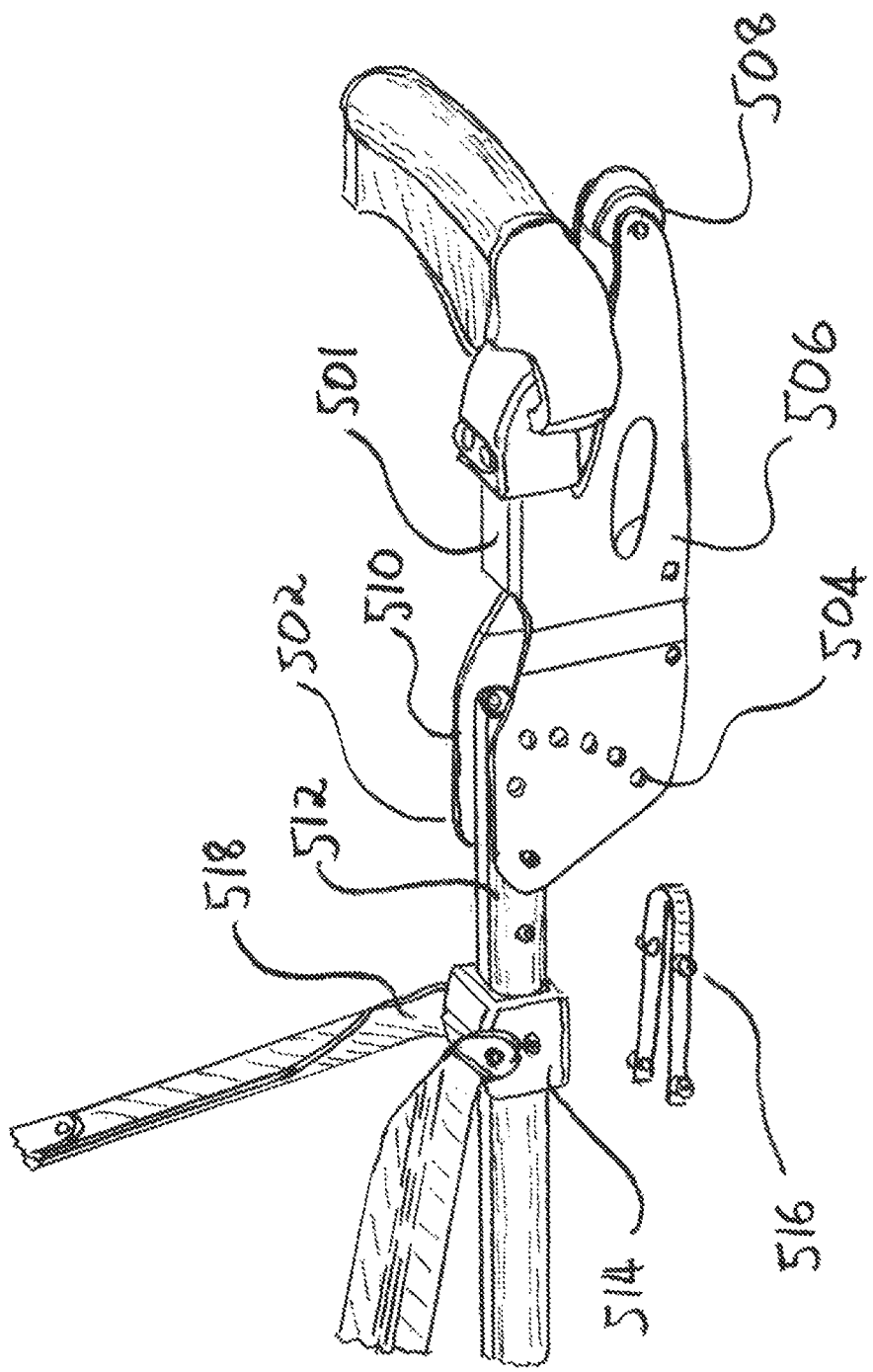

FIG. 12 Adjustable main handle, Constr. Y

Figure 13:
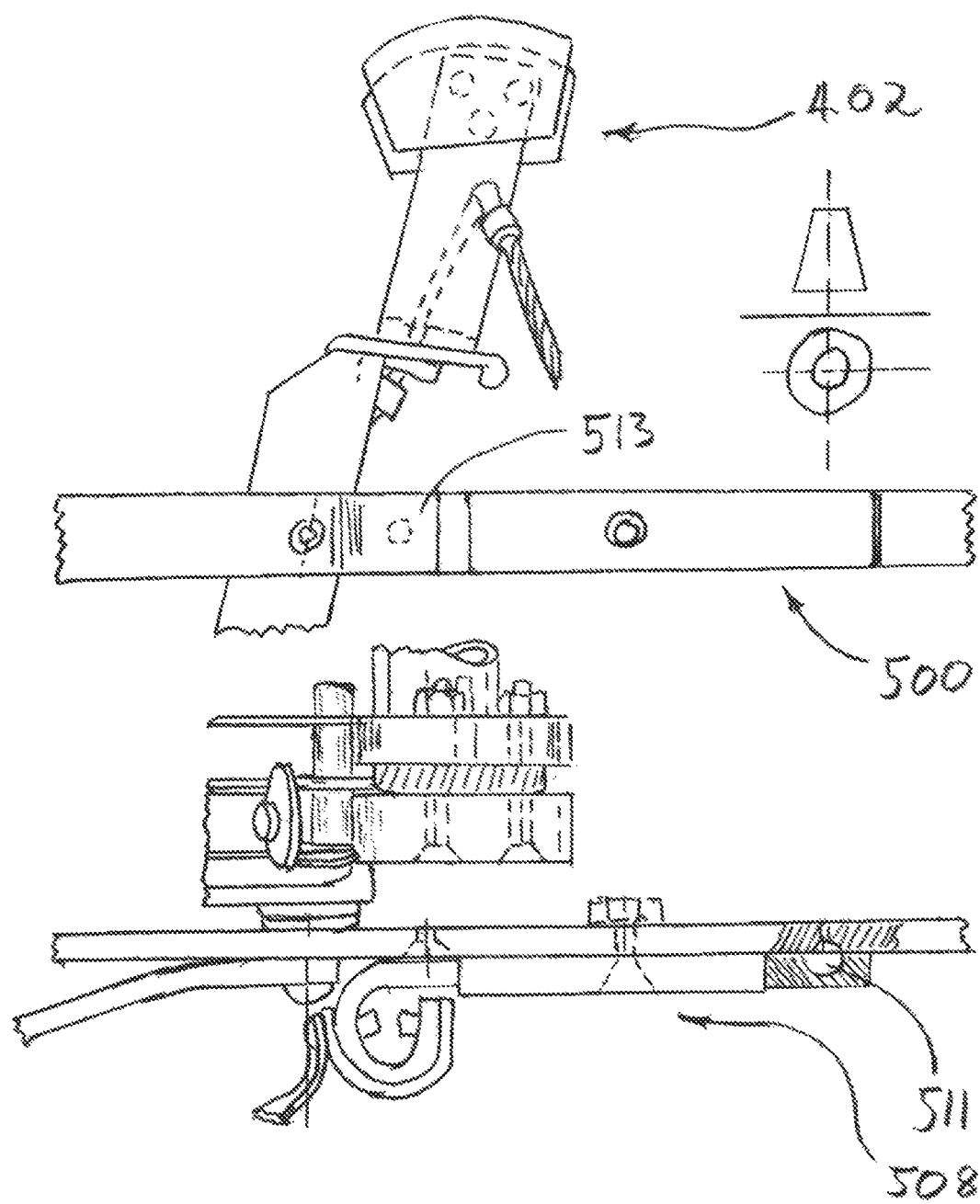

FIG. 13 Upper and lower mounting brackets.

Figure 14:
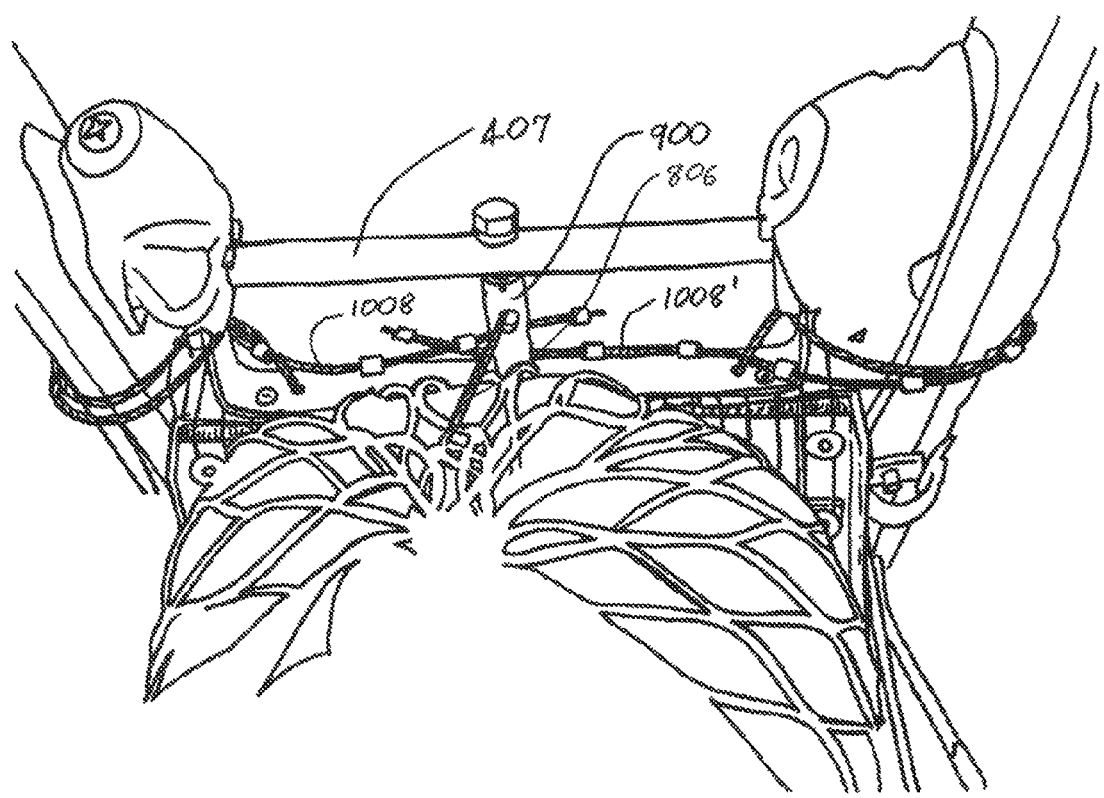

FIG. 14 Locking: skis and security bag, general view.

Figure 15:
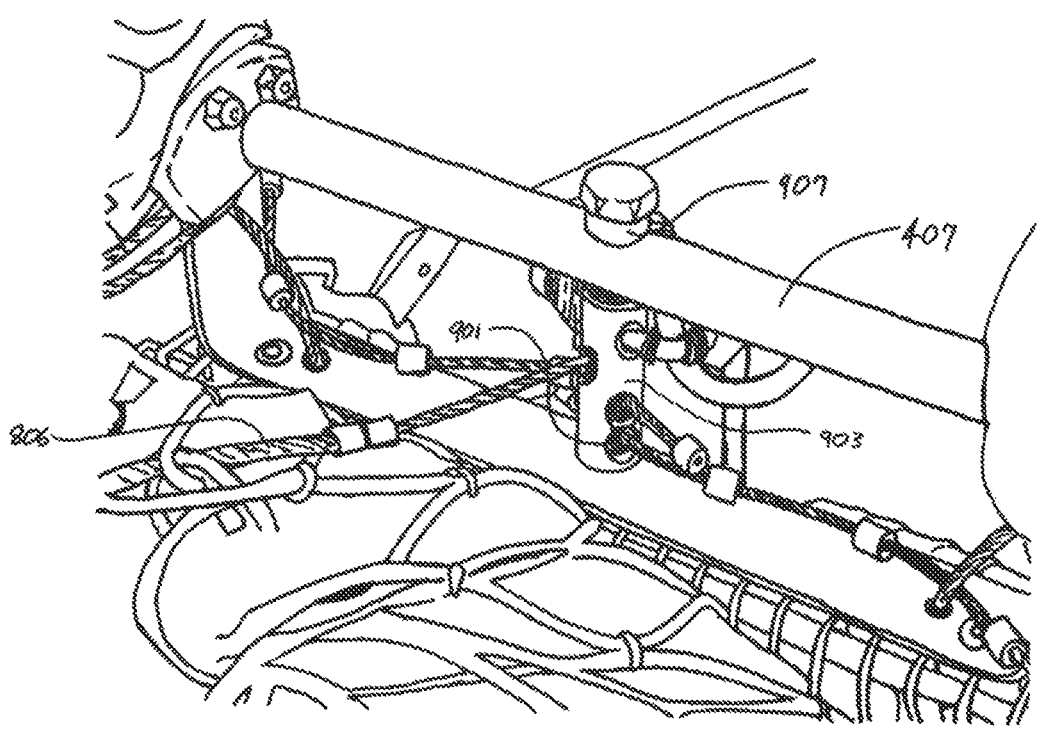

FIG. 15 Ski and bag locking cables threaded through locking post.

4. DETAILED DESCRIPTION OF FIGURES

The figures depict two versions of the invention: one version is of an earlier prototype, and the other is of a later version with some preferred design details. Each drawing is internally consistent, and variations of the design details are described in connection with the relevant drawing.

FIG. 1 Partially Loaded, General View, Constr. Y

The front of the unit is defined as the direction in which the handle (600) extends. This arrangement of the main structural and load elements is stable for any order of loading, although the most stable sequence is to load the boots first. To pull the cart along, one first 225 pushes down on the handle to raise the rear of the cart until the balance point is reached, after which one pulls with one hand.

Figure 2:
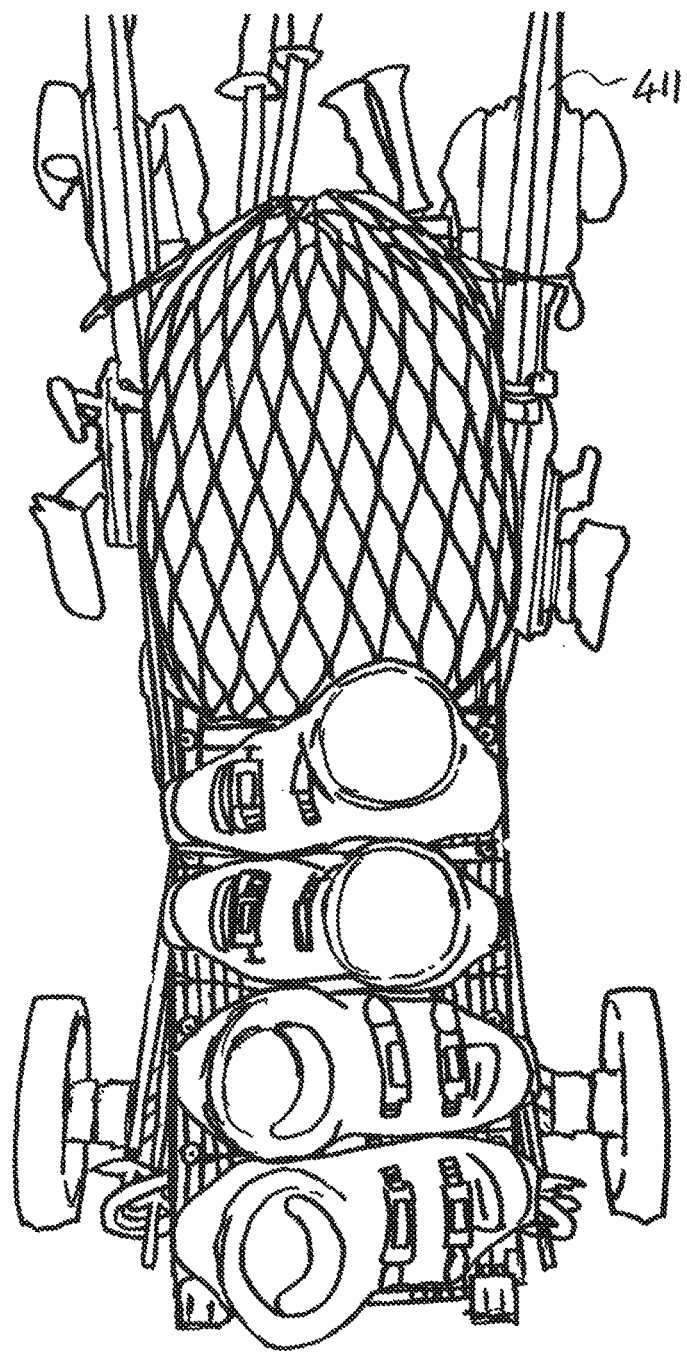
Figure 2A:
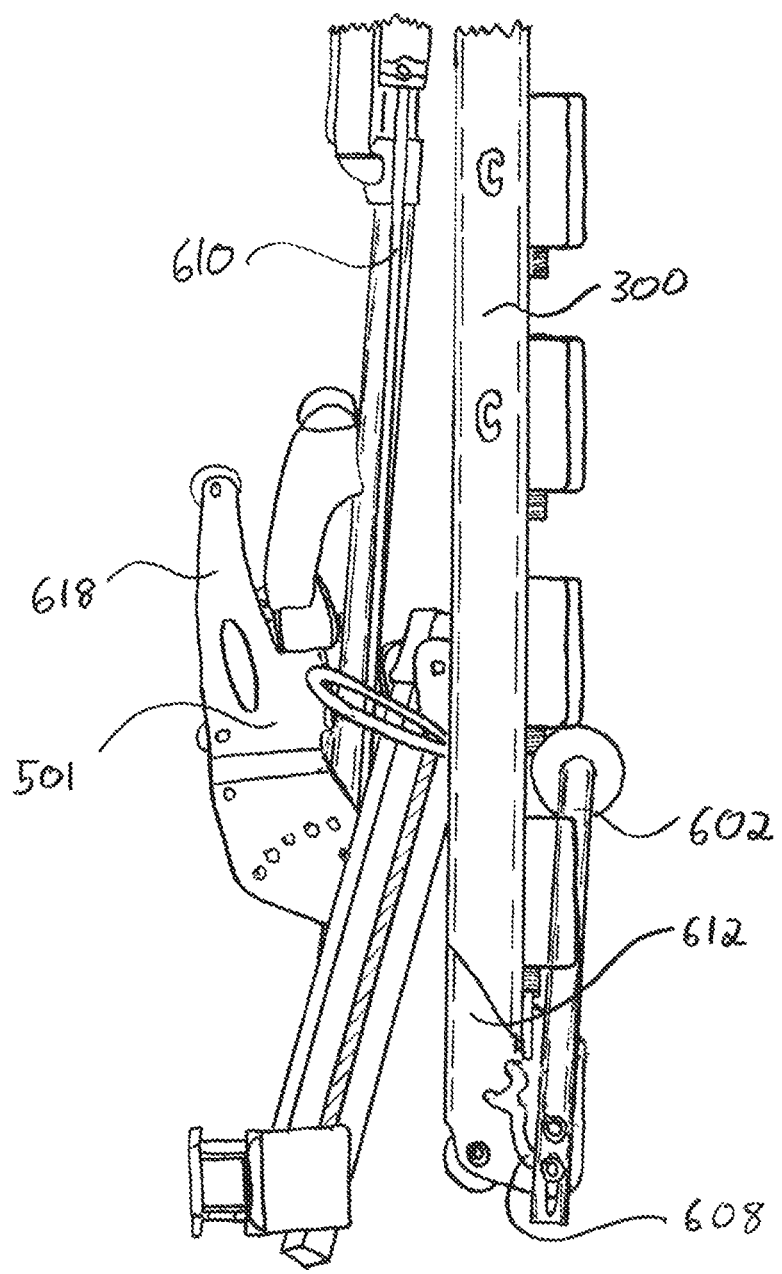
Figure 3:
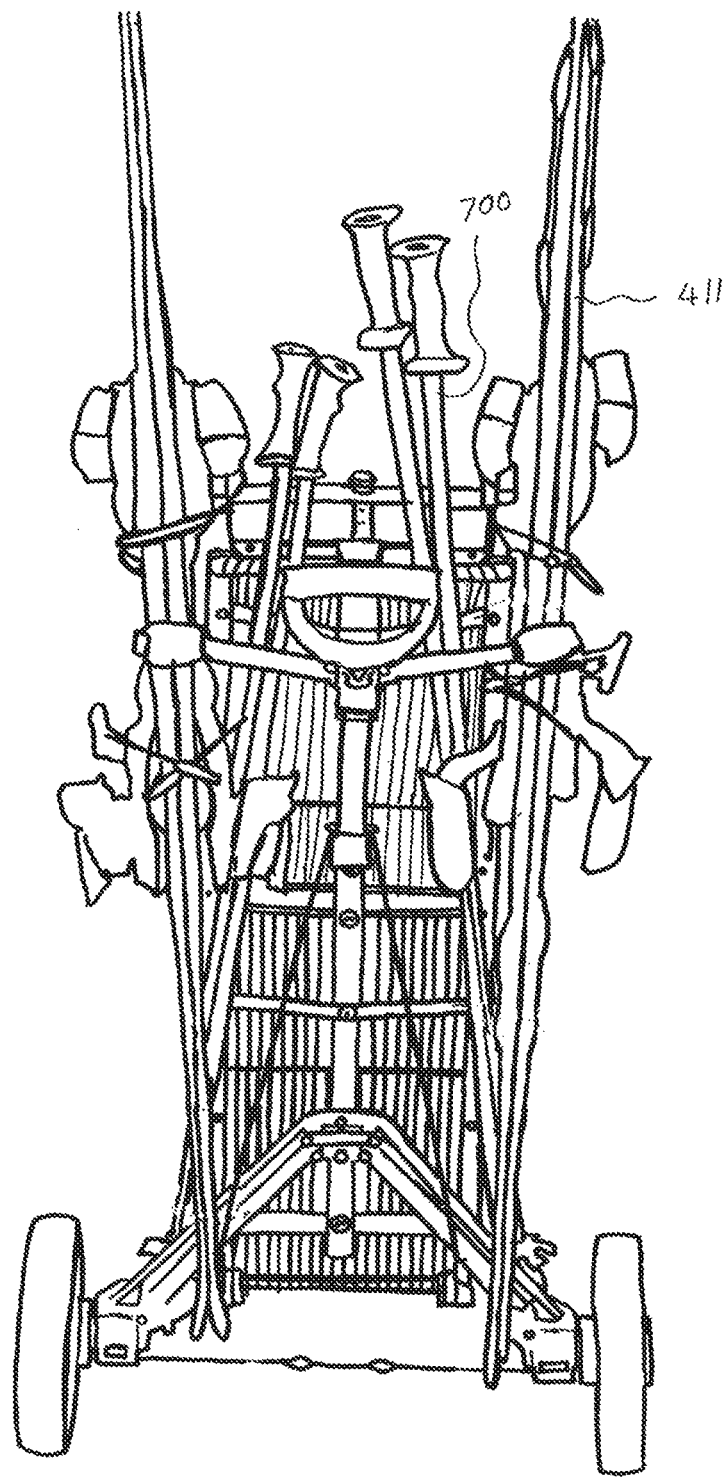

FIG. 2 Loaded, General View from Rear, Constr. X

The wheels are the widest part of the loaded assembly, and the bindings on the outer skis do not protrude to snag door frames or other obstructions. The bottoms of the ski poles are held in a position that does not present a tripping or laceration hazard. The mesh security bag encloses a waterproof nylon bag similar to a "stuff bag" used for packing sleeping bags. The ski boots are shown mounted on the lower part of the platform, referred to as the boot deck. In this illustration the harnesses holding the boots in place have been omitted.

The load surrounds the longitudinal axis of the cart in a compact way, giving a relatively low moment of inertia about the long axis. This helps to reduce forces on the undercarriage when moving over uneven ground.

The center of gravity relative to the wheel base is such that the cart is very stable against toppling over sideways.

FIG. 2a Folded for transport or storage, side view, Constr. Y

Note the shape of the slot (608) for the detent rod travel.

Figure 2B:
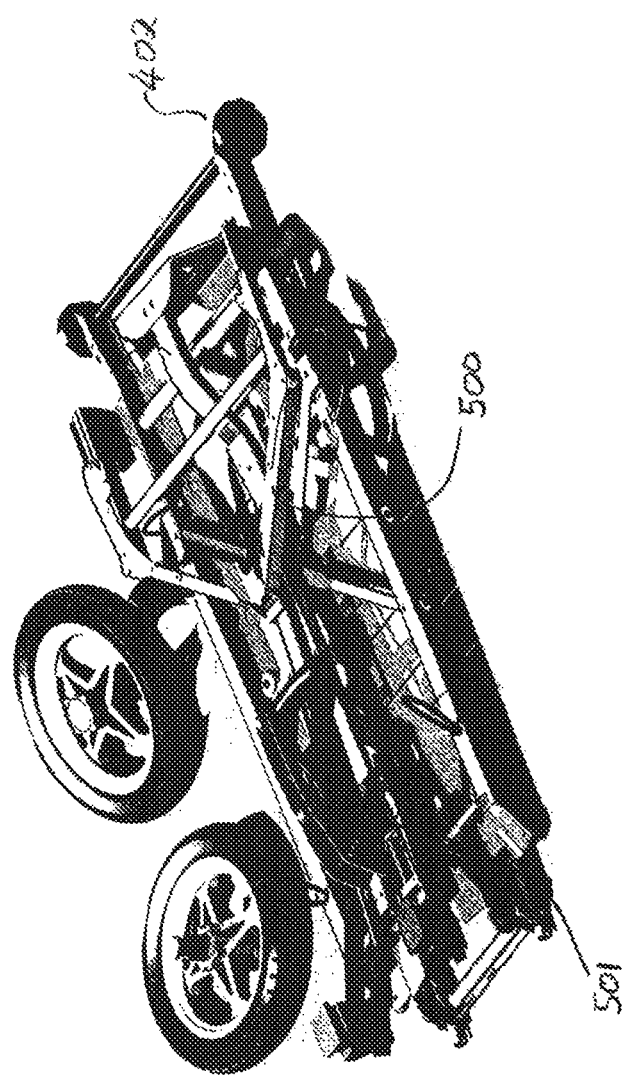

FIG. 2b Folded for Transportation or Storage, Underside. Constr. Y

After removing skis or snowboards and detaching the wheels, the cart can be folded for transport in an automobile. The length of the folded cart allows it to fit in the trunk of a mid-sized sedan. This feature allows users to keep most of their snowsports equipment and accessories together in a compact package.

FIG. 3 Loaded, General View from Front, Constr. X

This view shows the ski poles nested behind the bindings of each of the inner skis. The tails of the skis are positioned between the wheels and just forward of the wheel mounts.

The load distribution on the cart leads to a relatively high moment of inertia about the wheel axis, and this gives the handle a more stable feel when moving over uneven ground. Because the loaded cart has a relatively low moment of inertia about a vertical axis, quick changes of direction are easy to make.

The undercarriage, main tube, main handle, upper yoke and latching cap of this Construction are modified components of a mass-produced golf pull-cart. Certain details of this submission relate to incorporation of these components drawn from the Model M300 golf pull cart sold in the U.S.A. by Bag Boy Inc. The components are used in a different arrangement from that of the original golf cart. The main tube has one end bent into an offset, which on the golf cart serves to align the lower cradle that supports the golf bag with the upper cradle. On the golf cart, the undercarriage is attached to the main tube near this offset. For use in this Construction of the ski equipment cart, the main tube is inverted, so that the offset is at the upper end of the assembly rather than near the undercarriage. Here it serves instead to support the cradle. The cradle, in turn, is adapted from the upper cradle of the golf cart. To achieve these modifications, the main tube is drilled for new positions of the undercarriage, main handle and other fittings.

Other mass-produced golf pull-cart frames could be adapted in a similar way, provided the components are sufficiently strong and durable and the overall golf cart configuration is similar to that shown here.

Figure 3A:
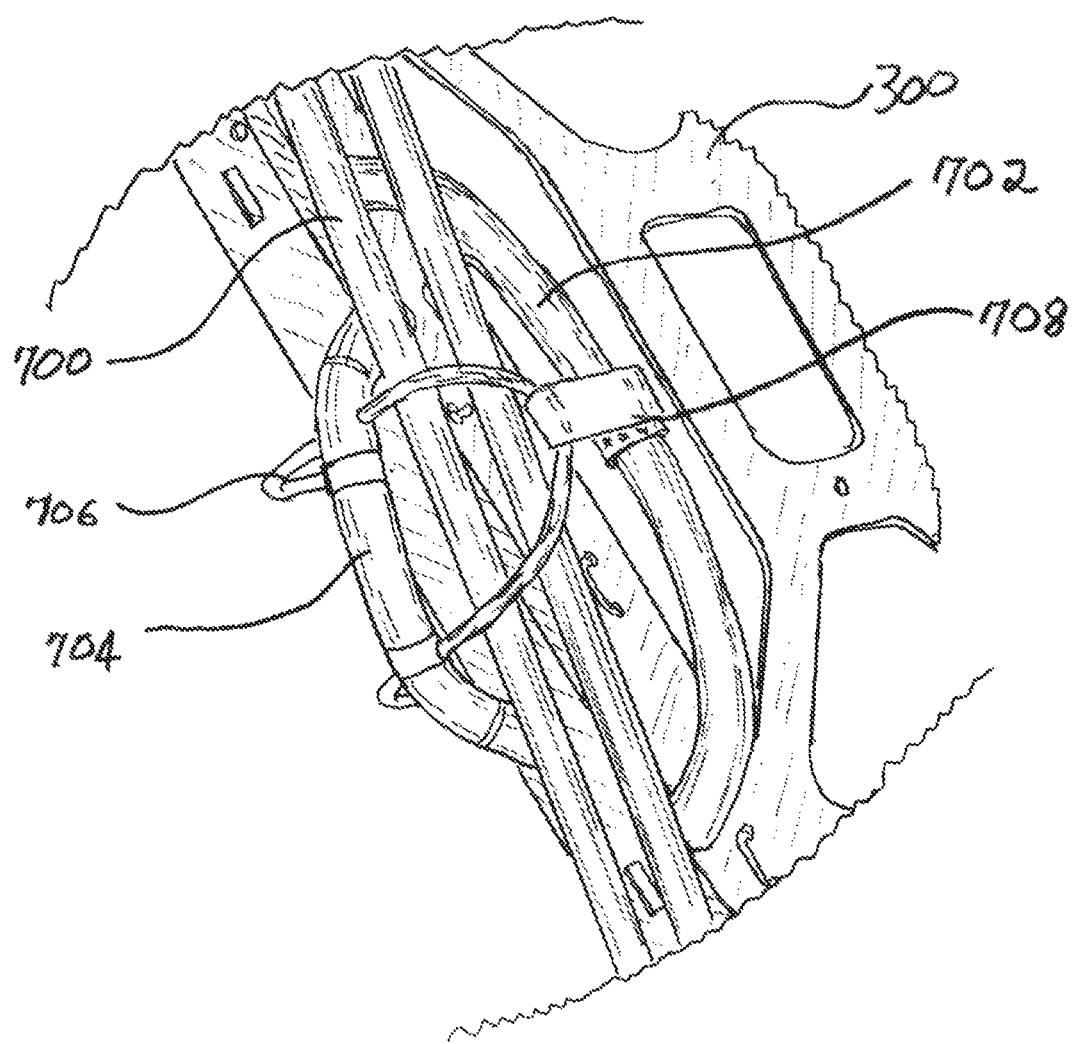

FIG. 3a Ski Pole Upper Mount, Constr. Y

Each pair of ski poles (700) rests in a saddle formed by three elements. The lateral (704) and 280 dorsal (702) pole supports are made from flexible but moderately stiff material, such as thick-walled rubber hose. The flexibility allows the guides to conform to different shapes of ski-pole bundles, and to be deflected when necessary. A flexible polymer cord (706) is stiff enough to stop the pair of poles from sliding off the lateral support during loading. A hook-and-loop strap (708) ties the bundle firmly for travel. The friction of the materials used to 285 form the support bundle helps to keep the lower ends of the pole bundle securely in the stirrups, not shown in this view.

Figure 4:
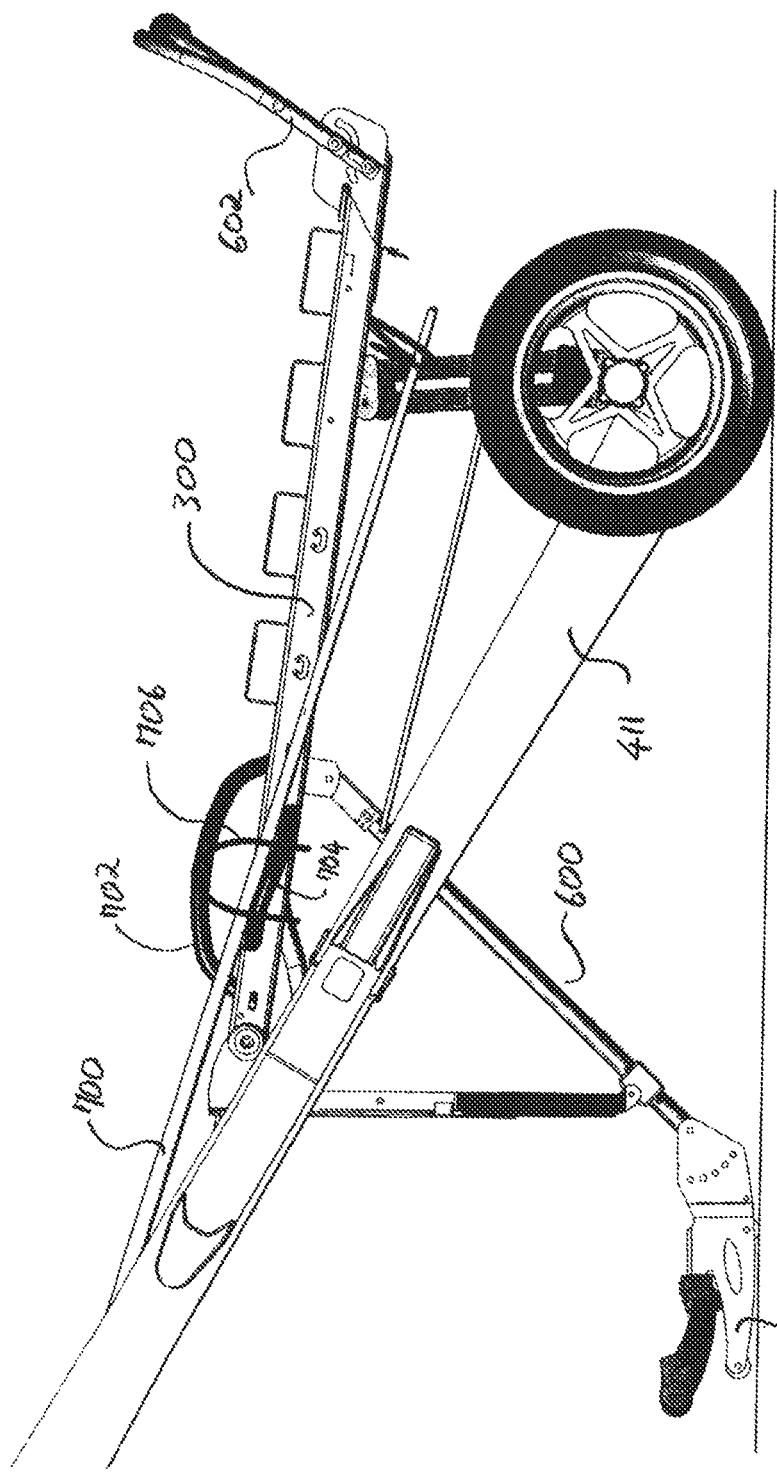

FIG. 4 Positioned for boot mounting, Constr. Y

Laying the cart down on its main handle (600) presents the lower part of the platform (300) or boot deck in a horizontal position that facilitates mounting and dismounting boots. The illustration shows how the skis and ski poles can be in place when the front of the cart is lowered for this prone position, but usually boots would be mounted before mounting skis and poles, and the latter would be unloaded before the cart is lowered for unloading the boots. The arrangement is such that the skis' bottom ends do not snag on either the ground or the undercarriage when the cart is lowered into this position. The handle extension (618) rests on the ground. The ski mounting is such that the tail of the ski is within the sweep of the wheel. This allows the unit to traverse stairs like a conventional dolly without the skis interfering with the stairs.

FIG. 5 One-Piece Formed Sheetmetal Deck with Boot-Mounting Clips, Constr. Y

For large-volume production, it may be preferable to produce a platform of monocoque design, employing wire mesh, fiber-reinforced resin, injection-molded plastics or formed sheetmetal. Construction Y uses formed sheetmetal. Such designs could also be arranged so 305 that the undercarriage arms are attached to half-brackets near the lateral extremities of the platform rather than to one central bracket.

The platform or deck (300) of FIG. 1 is cut from a single sheet of metal such as aluminum and formed to generate the bent features shown. The upper part of the deck to which the cable mesh bag (not shown) is secured, does not incorporate the wire mesh surface of the earlier Construction. Because the earlier Construction of the cable mesh bag used the wire mesh as part of one side, the cable mesh bag used with this style of deck has all of its component panels sized so that the cable mesh panels, when joined together, form a complete bag.

Eight identical wire clips (102) serve to secure four ski boots to the deck. Although the clips are identical, clips that hold the toe of the boot are mounted differently from those holding the heel. The toe clips (104) are arranged to be able to slide in parallel slots (106) against an elastic tension, while heel clips (102) are positioned near the opposite edge of the deck. Ski boots are mounted by first angling the toe of the boot down to the surface of the deck and inserting the toe lip under the toe clip, then sliding boot's sole toward the edge of the deck so that the toe clip is pulled along. When the heel of the boot has followed far enough to be inboard of the heel clip, the heel lip is captured by lowering the heel to the surface of the deck, and then allowing the heel to be pulled back under the heel clip.

This form of heel and toe clip automatically compensates for variations in the heights between the heel and toe lips and the boot sole. Both clips are arranged so that they can pivot below the level of the deck when loaded. The clips lean outwards until each pinches the boot down onto the surface of the deck. The angle of the toe clip to the deck surface provides a component of force that pulls the boot down onto the deck. The tension provided by the elastic element to the toe clip must be sufficient to hold the boots firmly on the deck.

Apertures provided in the deck surface are shaped so that the toe and heel clips can be installed without causing any plastic deformation of the wire form.

Apertures in the deck web (108) serve as anchors for the elastic polymer that keeps the toe-clip under tension. The overbent skirt provides slots (110) for attaching the anchor cables that stabilize the deck relative to the undercarriage. Keyhole-shaped apertures (112) provide for easy tethering of the lengths of shock cord that stretch a fabric cover over the cable-mesh security bag. A knot or ball at the end of each length of cord is held by the narrow end of the keyhole.

At the end of the deck furthest from the boot mounts, a slot with a narrowed waist (118) provides a place to store the unit's coiled locking cable (not shown.)

Figure 5A:
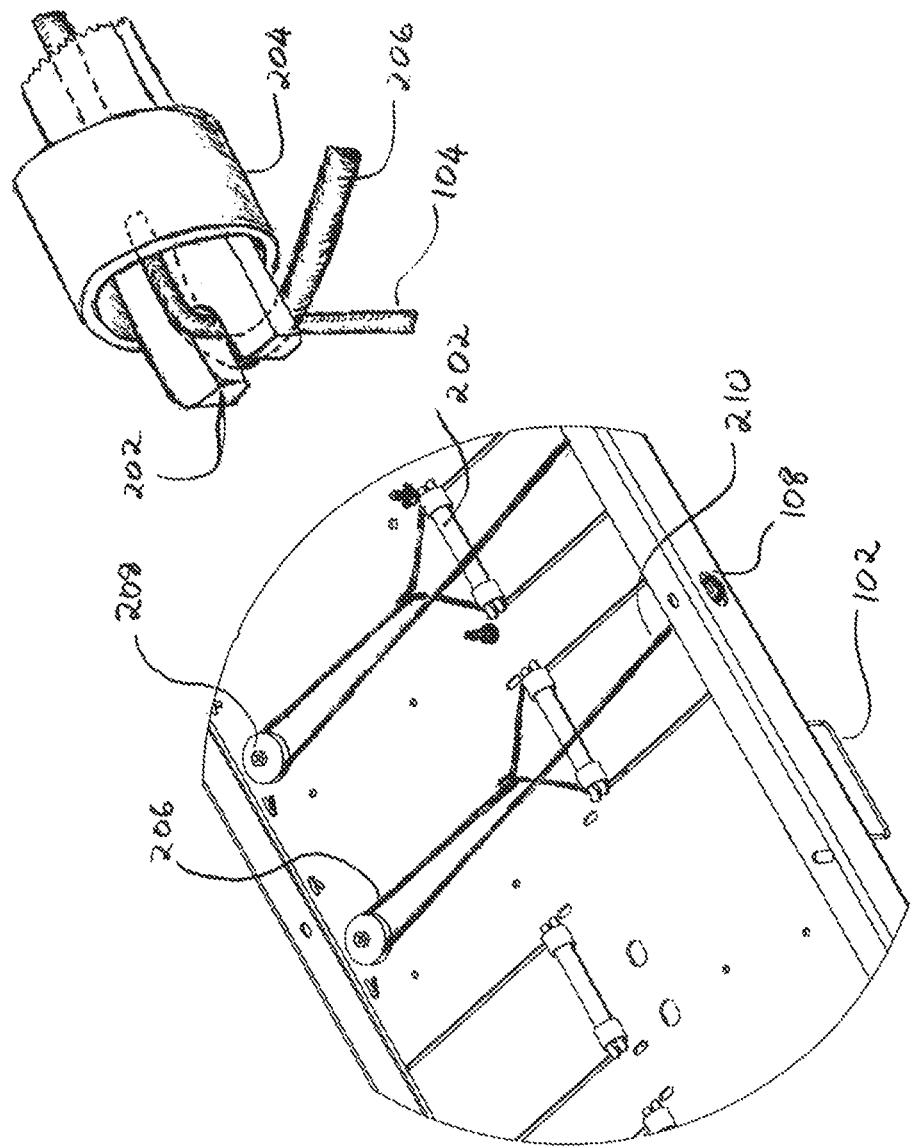

FIG. 5a Arrangement for tensioning the toe clips, Constr. Y

FIG. 5a shows a view of the underside of the portion of the deck that carries the boots, with the tensioning arrangement shown for one pair of boots.

The tensioning arrangement for the toe clips includes an elastic cord (206), a sheave (208) and the bale assembly to which the toe clip (104) mounts. Use of a longer elastic element by means of the sheave and the anchor point at (108) allows the tension to be more constant over the toe clip's length of travel. This arrangement also means that longer, and therefore heavier boots, are automatically held with greater force to the deck.

A tubular spacer (204) supports a cross-bar (202) in such a position that the hook of the toe clip (104) is held away from the underside of the deck. These elements are sized so that the gap between the underside of the deck and the inside of the toe clip hook is the same as the difference in height above the deck surface. This arrangement allows for the toe and heel clip wireforms to be identical, although other arrangements may be preferred for larger-quantity production.

Skewing of the cross-bar is reduced by attaching each of its ends to the elastic cord in the form of a yoke as shown. The toe clip is retained in its slot in the cross-bar by the elastic cord (206), and is prevented from dropping by the tubular spacer.

The elastic cord forming the yoke passes between the cross-bar and the upper wall of the spacer, along the cross-bar, and back via a similar path through the opposing spacer. The elastic cord (210) passes underneath the cross-bar, thus keeping it positioned against the underside of the deck while allowing the toe clip to give way without being damaged if necessary.

When no boot is present, the toe clip is held more or less perpendicular to the deck surface so that the aperture remains large enough for the toe of the boot to be inserted. This is achieved by providing posts for the cross-bar to rest against at the same stage that the clip wire comes up against the ends of the slots in the deck. Since the elastic cord tension is applied to the cross-bar assembly at a level between the two support points, the toe clip remains in the desired position.

The heel clips are also kept off the surface of the deck and ready to receive the heel. This is achieved by means of a coil spring threaded on to each arm of the clip, pushing against the deck surface at one end and a retainer (such as a washer trapped by swaged ears) at the other.

FIG. 6 Partially-Loaded and Folded for Shuttle Bus Access, Constr. Y

At many ski resorts, shuttle buses are available to carry skiers from outlying parking lots to the base facilities. In most cases the buses have outside racks for carrying skis and poles. The cart allows its users to take advantage of shuttles by folding down into a roll-on configuration 385 that two people can easily lift into the bus and that is narrow enough to traverse the aisle.

Users unclip skis from the cart and place them in the shuttle's racks. Boots, poles and the storage bag remain in place. As the handle folds down, the wheels also fold down towards the platform and draw in to a narrower span than before. The parallelogram arrangement of the golf-cart undercarriage keeps the wheels parallel to each other and perpendicular to the ground, so that the cart can be wheeled like a dolly down the aisles of the bus.

In this Construction, the platform, undercarriage and ski poles are arranged so that they do not interfere with each other when the cart is in this "roll-aboard" position.

In the "dolly" or narrow mode configuration, the bottom hoop is deployed so that it supports the overhung weight of the ski boots (not shown) and prevents the cart from toppling over backwards. The extension handle is shown stowed in this figure, but the length of the handle is such that it need not be stowed for the dolly configuration.

FIG. 6a Ski Mounting, Constr. X

The preferred loading sequence for Construction X calls for the skis to be mounted only after the boots have been mounted and the cart is returned to the upright position. If the skis are mounted before the boots, and the cart is parked on forward-sloping ground, and the cart is bumped from the rear, the cart and skis could topple forward. Mounting the boots first provides enough counterweight to avoid this possibility.

Skis are mounted by using the nested pairing that skiers are familiar with. With the skis held pointing upwards, the nested pair is first turned so that the binding lever of the outside ski will be above the binding lever of the inside ski. In this Construction, the ski cart has two pairs of binding shoes (402) configured to engage the receiving cavities in a forward ski binding. After positioning the bottom of the skis just ahead of the nearside wheel, the inner ski binding is lowered onto the pair of binding shoes as indicated by the arrow. The pair of skis is then secured by bringing together the two ski straps (503, 505) and drawing the adjusting strap tight while squeezing the two skis together. The pair of skis is thus supported by the binding shoes and restrained by the ski straps.

FIG. 7 Ski-mounting details, lower ski mounting bracket, Constr. Y

The pair of skis (411) rests against a sleeve (408) and non-slip trim (410) on the lower ski mounting bracket (413). An elastic cord (502) or some other form of strap holds the pair of skis in place against the mounting bracket (413) and the non-slip trim(410). After being stretched by hand, the cord is held in tension by pulling it through the pair of slots (414) and (416) under tension. These slots are in a material that is thin relative to the diameter of the cord, such as the sheetmetal elbow piece (403), and are sized so that the Poisson expansion of the cord when the end tension is released helps to prevent the cord from slipping. A polymer cord such as the "Polyflex" brand manufactured by Proflex Manufacturing of Macon, Ga., works well in this configuration.

FIG. 8 Lower Ski Mounting Bracket Main Arms, Constr. Y

The lower ski mounting bracket main arms of this Construction are offset from the main pivot point in such a way that the distance between the ski horn and the point where the ski rests against the lower bracket is short enough to accommodate bindings for small boots. The offset also permits the tail of each main arm to clear the bottom of the ski horn when the main arm is folded. The front pivot of the main arms is also offset, to prevent interference with the undercarriage support strut in the folded configuration.

FIG. 9 Storage Position for Bottom Handle, Constr. Y

The bottom hoop folds back over the deck for storage, and does not interfere with the boot clips.

FIG. 10 Partially-Loaded, View from Side, Constr. Y

The cart rests on a rear rest assembly incorporating a bottom hoop (602) provided with rests or bumpers (614) that keep the handle portion clear of the ground. A pivot rod (604) and a detent rod (606) extend to the other side of the bottom hoop. The detent rod locates the bottom hoop in three different operating positions by means of the slot (608). A compression spring within the hollow tube (602) and between (604) and (606) keeps the detent bar engaged.

The subframe (612) serves as the mount for the hoop assembly and stiffens the deck plate structure by mounting to the underside of the deck.

The undercarriage deployment strut (610) pivots off a different hole in the main handle tube than that originally provided by the golf pull-cart manufacturer. This allows for the correct range of motion for the undercarriage between the standard traveling or wide-mode configuration and the narrow-mode configuration.

FIG. 10 shows a lateral elevation of the cart in a parked attitude when resting on a rear assembly. Dashed line A-A' represents an edge-on view of a frontal plane extending along the longitudinal axis of the load platform. Dashed line B-B' represents an edge-on view of a wheel-axis plane extending through the wheel axis and oriented perpendicularly to the ground surface. Dashed line C-C' represents the longitudinal axis of the ski binding shown in FIG. 10.

FIG. 11 Subframe and kickstand or bottom hoop assembly, Constr. Y

The subframe (612) connects to the main deck.

FIG. 11a Unloaded, View from Side, Constr. X

The main handle hinge bracket (601) provides the fulcrum for the main handle's operation. To allow the handle and undercarriage to fold up completely for storage, the distance between the handle hinge bracket and the undercarriage bracket (105) is kept the same as on the original golf cart assembly.

The main handle strut (610) serves to displace the main handle from its original position on the golf cart, where the latching cap (617) was connected directly to the main tube slider (609).

The wheels used in this Construction are the wheels supplied with the Bag Boy golf cart, with the transverse overhang of the wide golfing tires trimmed down flush to the wheel rim. To allow easier movement through snow and slush, it is best for the wheels and tires to be as narrow as possible. A narrow profile allows the wheels to cut through the snow onto firm ground, and avoids the tires from having to push a berm of snow ahead of them. For small-volume production, trimming the original tires is a suitable solution, but a better solution where economically feasible is to have wheels and tires that are between 0.50" and 1.0" wide, with solid rubber tires that have a tread similar to that used on mountain-bike tires. Such a tread has the practical purpose of providing better fraction when the cart is being pulled across an icy slope, and the aesthetic purpose of differentiating the product from golf carts and making a connection with mountain biking The tires used in this Construction have an outer diameter of nine inches, but using a larger diameter wheel would provide for easier travel over rough ground, curbs and steps. Wheels giving an O.D. of between 12 and 16 inches would be desirable if economically justifiable.

The integrated security bag (800) is a key aspect of the invention, as it allows users to store their street shoes right at the slope, without the time and effort of two or more trips to the base lodge that may require traversing several flights of stairs to find and rent a locker. It is desirable that the security compartment on the cart be collapsible for compact storage and transportation of the unit. In addition to the design illustrated here that uses flexible aircraft cable in the form of a mesh bag, other collapsible designs that make use of folding and interlocking rigid panels are possible. When a cable mesh bag is used for the security compartment, the users' belongings are protected from the weather and hidden from view by use of a waterproof nylon stuff bag (801) cinched closed by a drawstring and carried inside the cable mesh bag.

Another approach to providing a security compartment is by means of a non-collapsible compartment mounted on the upper part of the platform. Such a compartment could be in the form of a hard-sided reinforced resin case typical of some suitcases and briefcases, or in the form of the type of aluminum equipment case often used for photographic equipment or tools. To compensate for the security compartment not being collapsible, the compartment could be detachable from the platform.

FIG. 12 Adjustable main handle, Constr. Y

The handle extension piece (501) serves to extend the handle's length, provide height adjustment via the fan of holes (504) (linch-pin not shown) and keep the handle grip clear of the ground during boot mounting by providing bumpers (508) and (506) as rests. Hole (510) is located so that it engages with a button of the pole clip (516) when the handle extension is folded counter-clockwise (in the view shown) for storage.

The ends of the lower ski bracket (518) are held by the slider (514) which in turn is located on the main handle tube (512) by the pole-clip (516).

FIG. 13 Upper and lower mounting brackets, Constr. X

The adaptor lever (508) has an indexing arrangement which holds it in different positions for skis and snowboards. The method shown uses a small ball bearing (511) that is held in a stepped hole by three indentations around the rim of the larger hole. The spring loading for the indexing action is provided by the flexibility of the selector lever and the lower mounting bracket.

The overall height of the binding shoes (402) above ground level is sufficient to allow skis and snowboards to clear the ground when the cart is in the upright and walking positions. The dimension between the binding shoes and the lower mounting bracket (500) is sufficiently short to allow all but the very smallest ski bindings to fit.

The lateral position of edge guide (513) relative to the binding shoes aligns the bottom of the skis just in front of the wheel hub, and the relative transverse position keeps the bottoms of the skis to the inside of the wheel. These positions are important for aligning the skis correctly to satisfy the constraints of the walking geometry.

FIG. 14 Locking: Skis and Security Bag, General View, Constr. X

The locking post (900) at the midpoint of the cross-handle (407) is the central node for all the locking functions on the cart.

This view shows the general layout of the two ski-locking cables (1008) and the security-bag locking cable (806) threaded through the locking post, without the lock installed.

FIG. 15 Ski and Bag Locking Cables Threaded Through Locking Post.

The locking post secures the cables by turning the outer cylinder (903) relative to the inner bolt (901), so that the aperture through which the locking cable passed is reduced by the offset in the holes. Locking lugs swaged or bonded to the locking cables prevent withdrawal of a cable from the locking post when the padlock maintains the inner and outer sets of holes in the offset position.

The locking lugs are preferably provided with a faring on each side to facilitate easier threading and withdrawal. For small-volume production, the faring can be provided by metal beads or by adapting teardrop-shaped zinc fishing sinkers to the diameter of the locking cables. Farings can be swaged, bonded or soldered in place on the cables, which are typically 3/32" or 1/8" diameter.

For easy cinching and opening, the security bag cinching and locking cable (806) should use 7×19 or similarly fine-wired cable that provides greater flexibility.

A spacer (907) positions the head of the locking post bolt a short distance above the cross-handle, to create the seat used by the snowboard-holding shock-cord loop.

For higher-volume production, an alternative locking-post arrangement would have the locking function achieved by the cross-tube (407) in combination with an internal cross-bolt. Such an arrangement would place the holes for the ski-locking cables adjacent to their ends of the cross-tube, with the hole set for the lock next to one of these. The hole-set for the security bag locking cable would remain at the center of the tube. Such an arrangement would make threading and removing the cables and lock easier, and would leave the center of the cross-tube free to be used as a lifting handle.

What is claimed is:

1. A device comprising:
    a hand-cart configured for a user to adjust an attitude of the hand-cart about a wheel axis of the hand-cart;
    a platform supported by the hand-cart and extending from a lower end proximate the wheel axis toward an upper end distal from the wheel axis, the platform including a plate defining a generally planar surface of sufficient area to carry at least one pair of ski boots and a securable container sufficiently voluminous to accommodate at least one pair of shoes;
    at least one ski mount assembly supported by the hand-cart and configured to detachably carry at least one ski outboard of the platform during use;
    wherein the ski mount assembly is disposed on the hand-cart to couple with a ski binding of the at least one ski during use so that a longitudinal axis of the ski binding intersects a frontal plane of the generally planar surface at an acute angle;
    wherein the hand-cart has a first half and a second half, the first half disposed closest to the wheel axis end of the hand-cart and the second half disposed at the opposing end of the hand-cart; and
    wherein the ski mount assembly is disposed alongside the second half of the hand-cart.

2. The device of claim 1, further including:
    (a) a securable container joined to the plate, the securable container further accommodating at least one item of the user in addition to the at least one pair of shoes, and;
    (b) at least one locking apparatus configured to lock at least the hand-cart to a structure.

3. The device of claim 2, wherein said securable container comprises a cable mesh bag and at least one flexible elongated security element configured to securely close the cable mesh bag.

4. The device of claim 1, wherein the at least one ski mount assembly further includes:
    (a) a ski horn configured to support the at least one ski from a toe binding of the at least one ski;
    (b) a lower ski bracket located at a predetermined distance below said ski horn;
    (c) a lateral ski rest extending past at least one edge of the at least one ski and;
    (d) a strap or elastic cord configured to releasably urge the at least one ski against at least the ski horn and the lower ski bracket.

5. The device of claim 1, further including at least one ski pole mount assembly joined to the platform and configured to releasably attach at least one pair of ski poles to the hand-cart, and comprising:
    (a) an upper mount including at least two elongated non-slip resilient members, each of the at least two said members flexed into an arc such that in combination the at least two said members form a saddle to receive a pair of shafts of the at least one pair of ski poles, and the at least two said members are joined to fastening means including flexible non-slip elements configured to draw together the at least two said members and so conformingly hold the at least one pair of ski poles in place, and;
    (b) a lower mount comprising at least one loop formed from a flexible resilient material and positioned to accept tips of the at least one pair of ski poles and support baskets of the at least one pair of ski poles.

6. The device of claim 1, further including:
    (a) at least one locking device capable of securing a plurality of locking cables, and;

(b) each locking cable of said plurality of locking cables is configured with such predetermined length and anchoring location so as to secure an item when each said locking cable is also held by the at least one locking device.

7. The device of claim 1, wherein at least a portion of the plate is constructed from sheet material, and at least one ski boot mounting apparatus is joined to said sheet material and comprises:
   (a) at least one set of elastically-urged heel and toe clips pivotally mounted to the plate and adapted to releasably join the at least one pair of ski boots to the plate;
   (b) apertures formed integrally into the sheet material to receive at least portions of said heel and toe clips therethrough;
   (c) each of said heel and toe clips positioned on the plate such that each ski boot of the at least one pair of ski boots is carried on the plate alongside the other ski boot of the at least one pair of ski boots, and;
   (d) at least one bale joined to each said toe clip, said bale spanning between legs of each said toe clip and configured to slide on an underside of said sheet material.

8. The device of claim 1, further including:
   (a) a main handle having at least one deployed position configured to support a share of a fully-loaded weight of the hand-cart when the hand-cart is placed so as to rest a forward portion of said main handle on a base surface, and
   (b) said platform, said main handle and an undercarriage assembly including a pair of wheels all so disposed relative to one another such that when said pair of wheels and a terminal portion of the main handle rest on said base surface, then said platform lies in a recumbent attitude configured to facilitate loading of said at least one pair of ski boots.

9. The device of claim 1, further including a U-shaped bottom handle/stand assembly pivotally joined to a lower end of said platform and indexable to be held in at least three predetermined positions:
   (a) a first or undeployed storage position;
   (b) a second or partially-deployed position wherein the handle/stand provides support for the hand-cart to rest with a pair of wheels in a wide-stance mode, and wherein the handle/stand may also serve as a lifting handle for said lower end of said platform, and;
   (c) a third or fully-deployed position, wherein the handle/stand provides support for the hand-cart to rest stably upright with said pair of wheels in a narrow-stance mode.

10. The device of claim 1, further including a lower ski mounting bracket slidably and pivotally connected to a main handle of the hand-cart, wherein:
   (a) said lower ski mounting bracket is configured to releasably hold said main handle of the hand-cart in place for a wide-stance mode of a deployable undercarriage joined to the hand-cart;
   (b) said main handle of the hand-cart incorporates a predetermined pivot location for a set of undercarriage deployment struts such that said deployable undercarriage may be selectively deployed for rolling travel in either a narrow-stance mode or said wide-stance mode by actuation of said main handle, and;
   (c) said lower ski mounting bracket and said main handle of the hand-cart are configured to jointly fold into a storage position proximate to an underside of the platform.

11. The device of claim 1, wherein said at least one ski mount assembly further includes:
   (a) at least one ski horn configured to engage a toe piece of a binding of the ski or of a binding of a pair of skis nested with faces opposed, and;
   (b) at least one locking cable with one end fixed proximate the at least one ski horn and the at least one locking cable is configured to encircle said ski or pair of skis intermediate to binding heel pieces and toe pieces, and thereafter to pass through at least one restraining aperture proximate the at least one ski horn, and thereafter to be held by a locking device in such a way as to maintain a cable loop small enough to prevent said binding heel pieces or toe pieces from being withdrawn from said cable loop.

12. A ski equipment and accessories transport device comprising:
   a hand-cart configured for a user to adjust an attitude of the hand-cart about a wheel axis of the hand-cart;
   a platform supported by the hand-cart and extending from a lower end proximate the wheel axis toward an upper end distal from the wheel axis, the platform comprising at least one plate or a scaffolding of interconnected elongate members defining a generally planar surface of sufficient area to carry at least one pair of ski boots and a securable container sufficiently voluminous to accommodate at least one pair of shoes;
   at least one ski mount assembly supported by the hand-cart and configured to detachably carry at least one pair of skis outboard of the platform, and;
   wherein the at least one ski mount assembly comprises:
      a ski horn configured to support during use the at least one pair of skis from a toe binding of the at least one pair of skis;
      a lower ski bracket disposed at a predetermined distance from said ski horn;
      a lateral ski rest configured to extend during use past at least one edge of the at least one pair of skis; and
      an elongate holding member configured to releasably urge during use the at least one pair of skis against at least the ski horn and the lower ski bracket.

13. The device of claim 12, further comprising:
   (a) a securable container joined to the plate, the securable container further accommodating at least one item of the user in addition to the at least one pair of shoes, and;
   (b) at least one locking apparatus configured to lock at least the hand-cart to a structure.

14. The device of claim 13, wherein said securable container comprises a cable mesh bag and at least one flexible elongated security element configured to securely close the cable mesh bag.

15. The device of claim 12, further comprising at least one ski pole mount assembly joined to the platform and configured to releasably attach at least one pair of ski poles to the hand-cart.

16. The device of claim 12, further comprising:
   (a) at least one locking device capable of securing a plurality of locking cables, and;
   (b) each locking cable of said plurality of locking cables is configured with such predetermined length and anchoring location so as to secure an item when each said locking cable is also held by the at least one locking device.

17. The device of claim 12, wherein at least one ski boot mounting apparatus is joined to said platform.

18. A ski equipment and accessories transport device comprising:

a hand-cart configured for a user to adjust an attitude of the hand-cart about a wheel axis of the hand-cart;

a load platform having a generally planar surface supported by the hand-cart and extending from a lower end proximate the wheel axis toward an upper end distal from the wheel axis;

a longitudinal axis of the generally planar surface;

a frontal plane of the generally planar surface of the load platform and extending along the longitudinal axis of the generally planar surface;

at least one ski mount assembly supported by the hand-cart and configured to detachably carry at least one ski outboard of the platform during use;

wherein the ski mount assembly is disposed on the hand-cart to couple with a ski binding of the at least one ski during use so that a longitudinal axis of the ski binding intersects a frontal plane of the generally planar surface at an acute angle;

wherein the hand-cart is configured to have a parked configuration for parking on a flat ground surface;

wherein the longitudinal axis of the generally planar surface forms a forward angle to the ground surface when the hand-cart is configured in the parked position;

wherein the hand-cart has a first half and a second half, the first half disposed closest to the wheel axis end of the hand-cart and the second half disposed at the opposing end of the hand-cart; and wherein the ski mount assembly is disposed alongside the second half of the hand-cart;

wherein a wheel axis plane extending through the wheel axis and perpendicular to the ground surface intersects the frontal plane remote from the first half of the hand-cart and above the ground surface when the hand-cart is configured in the parked position.

* * * * *